US011917524B2

(12) United States Patent
Hamada

(10) Patent No.: US 11,917,524 B2
(45) Date of Patent: Feb. 27, 2024

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Masashi Hamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 17/476,207

(22) Filed: Sep. 15, 2021

(65) Prior Publication Data

US 2022/0086733 A1 Mar. 17, 2022

(30) Foreign Application Priority Data

Sep. 17, 2020 (JP) ................. 2020-156392

(51) Int. Cl.
*H04W 48/04* (2009.01)
*H04W 48/18* (2009.01)
*H04W 76/10* (2018.01)

(52) U.S. Cl.
CPC .......... *H04W 48/04* (2013.01); *H04W 48/18* (2013.01); *H04W 76/10* (2018.02)

(58) Field of Classification Search
CPC ..... H04W 48/04; H04W 48/18; H04W 76/10; H04W 24/02; H04W 76/27; H04W 84/047; H04W 88/04
USPC ....................................... 370/329
See application file for complete search history.

(56) References Cited

U.S. PATENT DOCUMENTS

2012/0039299 A1* 2/2012 Teyeb ................ H04W 40/04
370/331
2014/0226559 A1* 8/2014 Jactat ................ H04W 84/047
370/315

FOREIGN PATENT DOCUMENTS

JP 2020096128 A 6/2020
JP 2020096218 A 6/2020

* cited by examiner

*Primary Examiner* — Huy C Ho
(74) *Attorney, Agent, or Firm* — Canon U.S.A., Inc. IP Division

(57) ABSTRACT

A communication apparatus includes a management unit configured to manage communication between a communication device and a base station via a relay unit, and an update unit configured to, based on an update of first logical information used for access between the relay unit and the base station, update second logical information used for access between the communication device connected to the relay unit, and the base station.

22 Claims, 20 Drawing Sheets

FIG.10

| MANAGEMENT TARGET RELAY ID | PDU CONNECTION NUMBER | TARGET COMMUNICATION DEVICE ID | ASSIGNED IP INFO | USER ID |
|---|---|---|---|---|
| ABCDEF...00 | 1 | 898100AB...F0 | XXX.XXX.XXX.XXX | Alfa |
|  | 3 | 898100AB...F1 | XXX.XXX.XXX.YYY | Beta |
|  | 2 | 898100AB...F2 | XXX.XXX.XXX.ZZZ | Alt |
| ... | ... | ... | ... | ... |
| ABCDEF...01 | 2 | 898100AA...F0 | XXX.XXX.YYY.XXX | Dum |
|  | 1 | 898100AA...F1 | XXX.XXX.YYY.YYY | Jum |
| ... | ... | ... | ... | ... |

FIG.11

| MANAGEMENT TARGET COMMUNICATION DEVICE ID | CURRENTLY CONNECTED BASE STATION ID IP INFO |
|---|---|
| 898100AB...F0 | XXX.XXX.XXX.XXX |
| 898100AB...F1 | XXX.XXX.XXX.YYY |
| 898100AB...F2 | XXX.XXX.XXX.ZZZ |
| ⋮ | ⋮ |
| 898100AA...F0 | XXX.XXX.YYY.XXX |
| 898100AA...F1 | XXX.XXX.YYY.YYY |
| ⋮ | ⋮ |

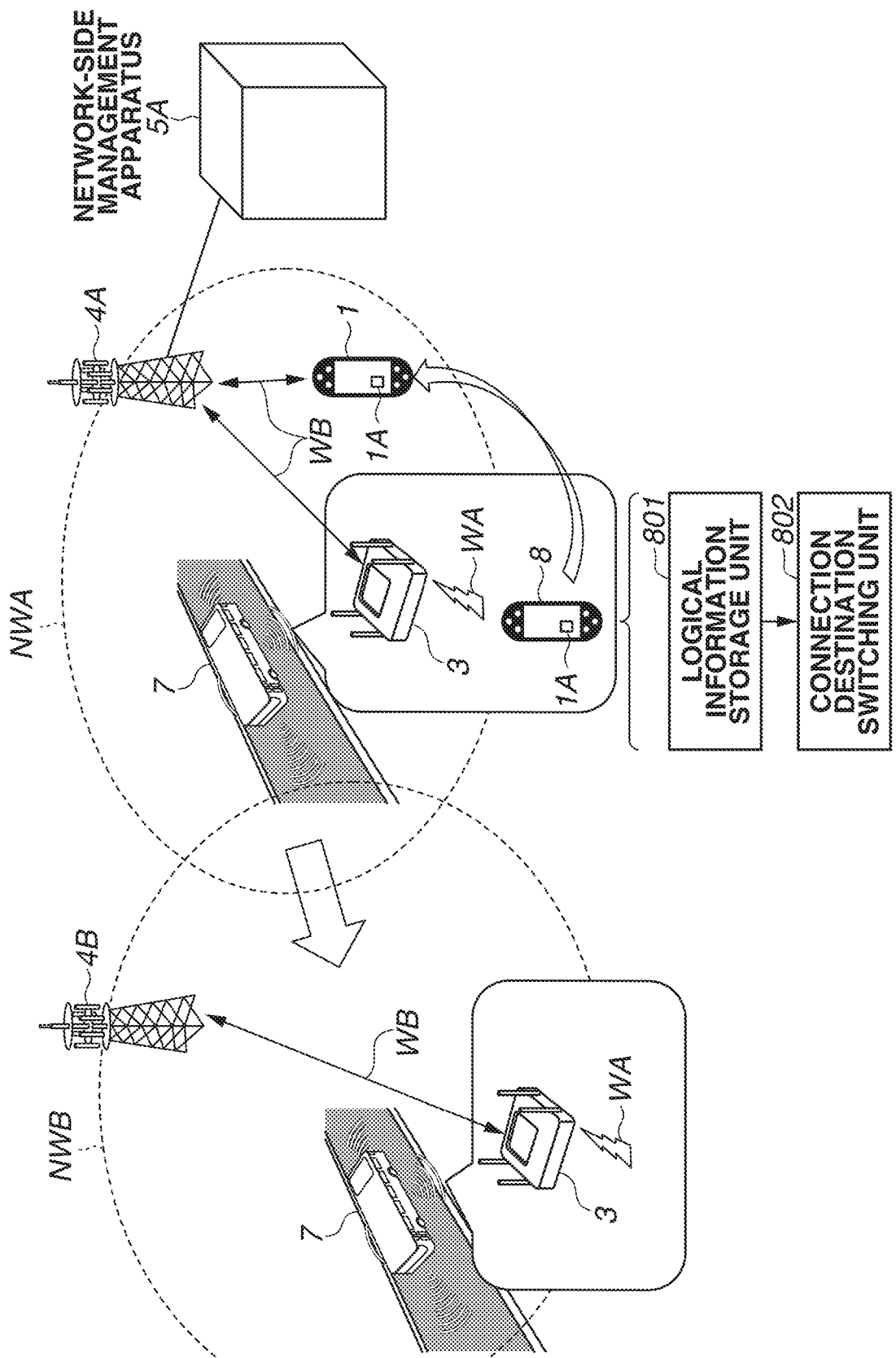

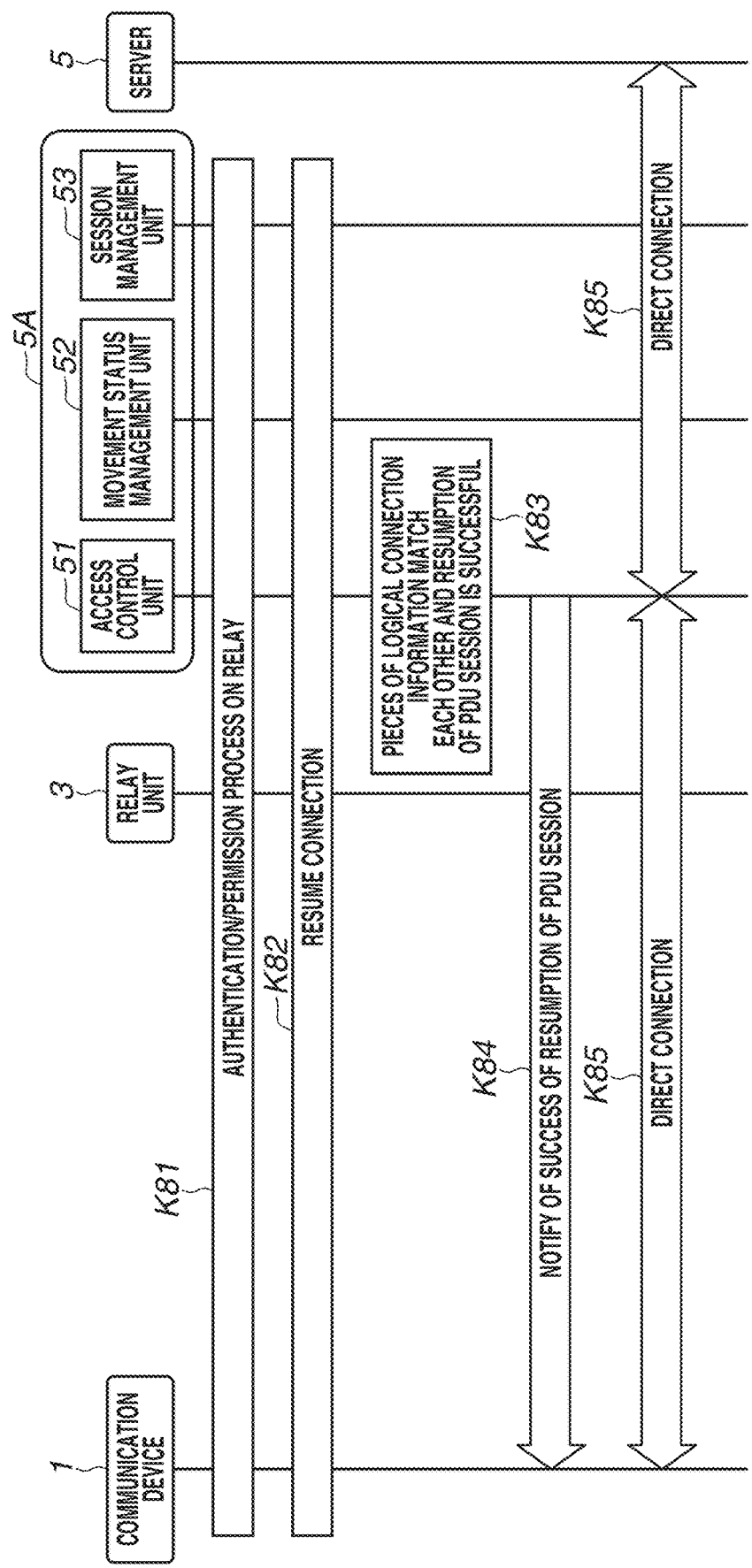

COMMUNICATION APPARATUS, COMMUNICATION METHOD, AND STORAGE MEDIUM

BACKGROUND

Field

The present disclosure relates to a communication apparatus, a communication method, and a storage medium.

Description of the Related Art

A relay communication apparatus for relaying a radio wave from a wireless base station and thereby expanding an area where wireless communication can be performed, has been developed.

A standardization organization is considering a network relay communication apparatus that provides, to a wireless communication apparatus, access to a wireless network during communication using a wireless communication medium for device interconnection communication. The network relay communication apparatus bridges (1) communication data transmitted from and received by the wireless communication medium for device interconnection communication, and (2) communication data transmitted from and received by a wireless communication medium for base station communication. In this way, the network relay communication apparatus provides access to the wireless network during communication using the wireless communication medium for device interconnection communication.

Japanese Patent Application Laid-Open No. 2020-96218 discusses a technique in which, when a wireless communication apparatus connected to a network relay communication apparatus makes a request to start relay communication to a wireless network, the wireless communication apparatus notifies a control apparatus on the network side of cell information regarding a neighboring cell that is collected by the wireless communication apparatus. In this technique, the wireless communication apparatus urges the control apparatus on the network side having received the notification to update cell information regarding a neighboring cell of the wireless communication apparatus that is recognized by the control apparatus, thereby resolving a discrepancy with control information regarding a residence cell of the wireless communication apparatus that is recognized on the network side.

In the technique discussed in Japanese Patent Application Laid-Open No. 2020-96218, in a case where a wireless communication medium used between a wireless base station and a network relay apparatus and a wireless communication medium used between the network relay apparatus and a wireless communication apparatus are different from each other, the wireless communication apparatus cannot recognize cell information regarding a neighboring cell. Thus, the technique discussed in Japanese Patent Application Laid-Open No. 2020-96218 cannot resolve the discrepancy between control information regarding a residence cell that is recognized by the wireless communication apparatus and control information regarding a residence cell of the wireless communication apparatus that is recognized on the network side.

If there is a discrepancy between the pieces of control information regarding the residence cell of the wireless communication apparatus that are recognized by the wireless communication apparatus and a wireless network management apparatus, when wireless communication for accessing a suspended wireless network is resumed, a negotiation procedure for reassigning control information is started. Thus, in such a case, it may take longer to resume communication as compared with a case where there is no discrepancy between the pieces of control information regarding the residence cell of the wireless communication apparatus.

SUMMARY

Various embodiments of the present disclosure provide techniques and mechanisms for reducing the time required until the resumption of communication between a communication device and a the base station, even in a case where a relay unit that relays communication between the communication device and the base station moves.

According to various embodiments, a communication apparatus includes a management unit configured to manage communication between a communication device and a base station via a relay unit, and an update unit configured to, based on an update of first logical information used for access between the relay unit and the base station, update second logical information used for access between the communication device connected to the relay unit, and the base station.

Further features of the present disclosure will become apparent from the following description of exemplary embodiments with reference to the attached drawings.

BRIEF DESCRIPTION OF THE DRAWINGS

FIG. 10 is a diagram illustrating an example of a table stored in a session management database of a network-side management apparatus according to one embodiment.

FIG. 11 is a diagram illustrating an example of a table stored in a movement status management database of a network-side management apparatus according to one embodiment.

FIG. 19 is a diagram illustrating a communication method using logical connection information according to a third exemplary embodiment.

FIG. 20 is a sequence diagram illustrating a communication resumption sequence of a communication device in a communication system using the communication method illustrated in FIG. 19.

DESCRIPTION OF THE EMBODIMENTS

With reference to the attached drawings, exemplary embodiments of the present disclosure will be described in detail. The following exemplary embodiments are not intended to limit the present invention, and not all the combinations of the features described in the exemplary embodiments are essential for a method for solving the issues in the present disclosure. The configurations of the exemplary embodiments can be appropriately modified or changed depending on the specifications of an apparatus to which the present invention is applied, or various conditions (use conditions and use environment). The technical scope of the present invention is determined by the appended claims, and is not limited by the following individual exemplary embodiments.

Figure 1:
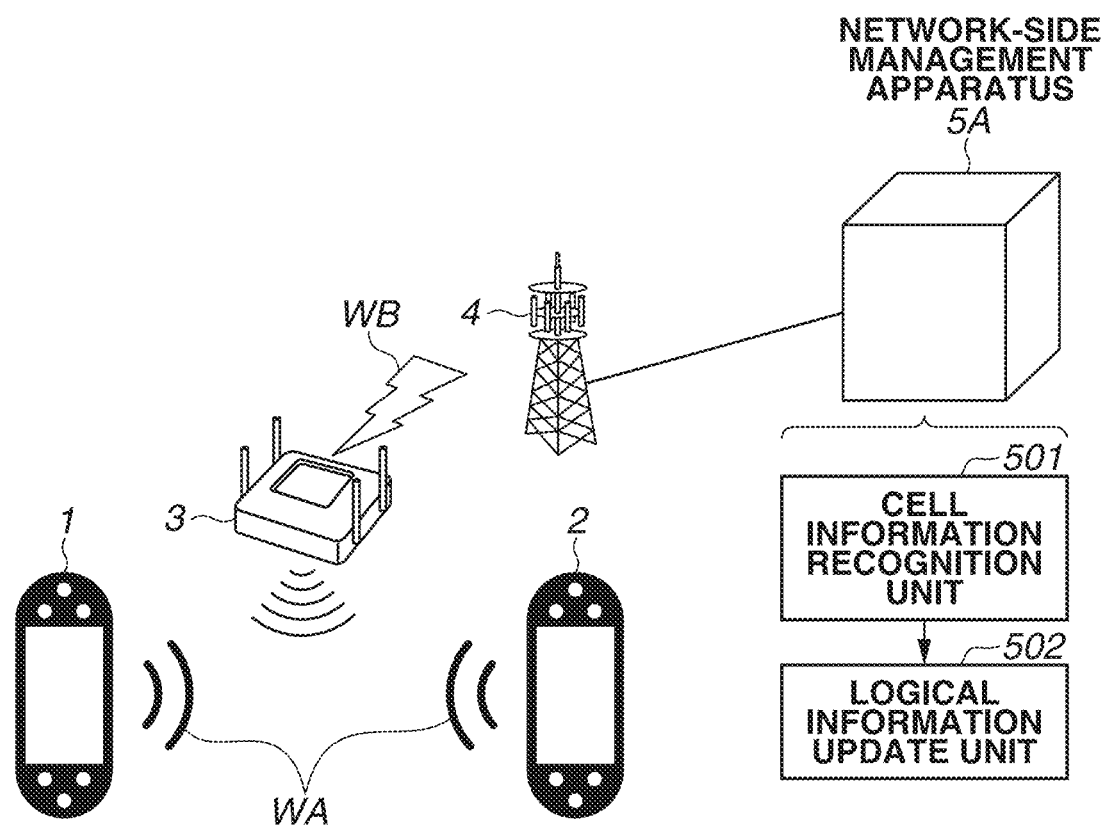
FIG. 1 is a diagram illustrating an example of a communication system according to a first exemplary embodiment.

FIG. 1 is a diagram illustrating an example of a communication system according to a first exemplary embodiment.

In FIG. 1, the communication system includes communication devices 1 and 2, a relay unit 3, a base station 4, and a network-side management apparatus 5A. For example, if each of the communication devices 1 and 2 is used as a mobile game apparatus, the communication system provides an online game service using the mobile game apparatus.

Each of the communication devices 1 and 2 performs local communication using a wireless communication medium WA and also perform network communication via the relay unit 3 while keeping using the wireless communication medium WA. In a case where each of the communication devices 1 and 2 starts network communication via the relay unit 3, each of the communication devices 1 and 2 receives the provision of logical connection information from the network-side management apparatus 5A. In a case where the wireless communication medium WA is used for communication, for example, a wireless interface termed PC5 for inter-apparatus communication is used. Each of the communication devices 1 and 2 is, for example, a wireless online game apparatus. Each of the communication devices 1 and 2 may be, for example, a mobile information terminal such as a smartphone on which an application for achieving a wireless online game is installed.

In a case where local communication (also referred to as "device interconnection communication") is used, the communication devices 1 and 2 can share user operation information during a game such as a shooting command in the game. In a case where network communication (also referred to as "base station communication") is used, the communication devices 1 and 2 can download data that is not present in the game apparatuses, such as data for high-definition reproduction of a game replay scene.

The relay unit 3 relays communication between each of the communication devices 1 and 2 and the base station 4. The relay unit 3 uses different frequency bands for a wireless channel of a relay source and a wireless channel of a relay destination. Each of the communication devices 1 and 2 can connect to the relay unit 3 using the wireless communication medium WA, and the relay unit 3 can connect to the base station 4 using a wireless communication medium WB. At this time, the relay unit 3 can communicate with the communication devices 1 and 2 near the relay unit 3 using the wireless communication medium WA while communicating with the base station 4 using the wireless communication medium WB. In a case where the wireless communication medium WB is used for communication, for example, a wireless interface termed Uu for network communication is used.

The relay unit 3 is installed at a location within reach of radio wave from the base station 4, such as near a window, and thereby can improve an indoor radio wave environment. The relay unit 3 is, for example, UE-to-Network Relay UE. In this case, each of the communication devices 1 and 2 is referred to as a "Remote User Equipment (UE)". A "Network Relay" is a wireless repeater. The communication devices 1 and 2 connected to the relay unit 3 monitor a channel that uses the wireless communication medium WA, and do not monitor a channel that uses the wireless communication medium WB, and thereby can save power.

The base station 4 is installed in each cell as a range within reach of radio waves. The base station 4 can communicate with the communication devices 1 and 2 and the relay unit 3 using the wireless communication medium WB.

The network-side management apparatus 5A manages communication between the communication devices 1 and 2 and the base station 4 via the relay unit 3. The network-side management apparatus 5A includes a cell information recognition unit 501 and a logical information update unit 502. The cell information recognition unit 501 recognizes a change in cell information managed by the relay unit 3. Based on an update of logical information used for access between the relay unit 3 and the base station 4, the logical information update unit 502 updates logical information used for access between the communication devices 1 and 2 connected to the relay unit 3, and the base station 4. The logical information is logical connection information such as user identification (ID) or an Internet Protocol (IP) address.

Figure 2:
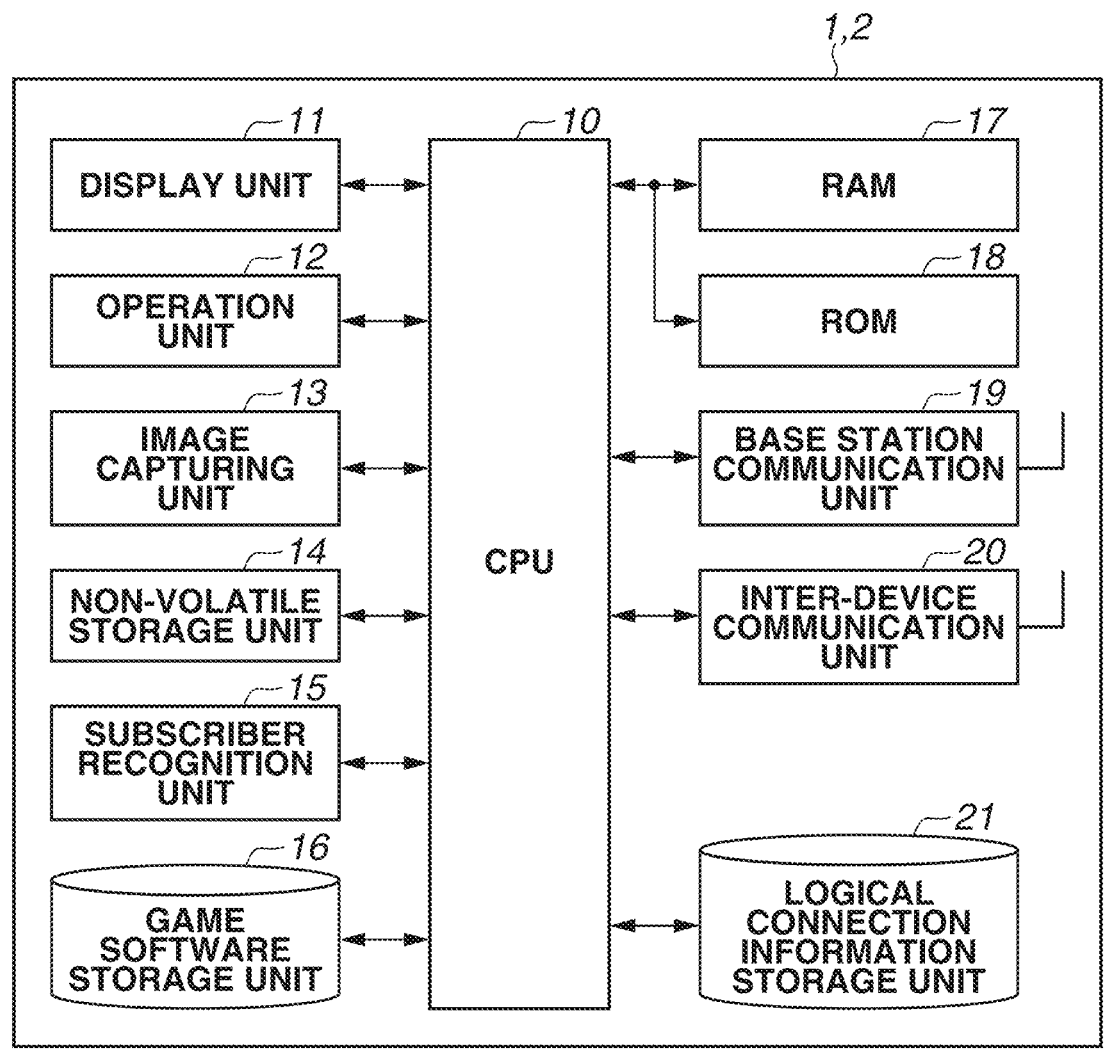
FIG. 2 is a block diagram illustrating an example of a configuration of a communication device according to one embodiment.

FIG. 2 is a block diagram illustrating an example of a configuration of each of the communication devices 1 and 2 in FIG. 1.

In FIG. 2, each of the communication devices 1 and 2 includes a central processing unit (CPU) 10, a display unit 11, an operation unit 12, an image capturing unit 13, a non-volatile storage unit 14, a subscriber recognition unit 15, and a game software storage unit 16. Each of the communication devices 1 and 2 also includes a random-access memory (RAM) 17, a read-only memory (ROM) 18, a base station communication unit 19, an inter-device communication unit 20, and a logical connection information storage unit 21.

The CPU 10 is hardware that controls each of the entire communication devices 1 and 2. The CPU 10 may be a graphics processing unit (GPU). The display unit 11 is, for example, a liquid crystal monitor, an organic electroluminescent (EL) display, or a micro-light-emitting diode (LED) display. The operation unit 12 is, for example, a key, a button, or a touch panel. The image capturing unit 13 includes an optical system such as an image sensor and a lens that has a camera function.

The non-volatile storage unit 14 is, for example, a memory card or a Universal Serial Bus (USB) memory.

The subscriber recognition unit 15 identifies a subscriber given the right to use each of the communication devices 1 and 2. The subscriber recognition unit 15 has a subscriber identity module (SIM) function. The game software storage unit 16 stores game software and content information regarding an image and a character displayed during a game. At this time, each of the communication devices 1 and 2 can provide a service by combining the content information stored in each of the communication devices 1 and 2 itself and information acquired via a wireless communication line. The RAM 17 stores a program that is being executed by the CPU 10, or provides a work area for the CPU 10 to execute a program. The ROM 18 holds execution files for various programs and data used to execute the programs.

The base station communication unit 19 is an interface used for communication with the base station 4. The base station communication unit 19 is, for example, a wireless interface termed New Radio (NR) Uu. The inter-device communication unit 20 is an interface used for direct communication between the communication devices 1 and 2. The inter-device communication unit 20 is, for example, a wireless interface termed NR PC5. The logical connection information storage unit 21 stores logical connection information assigned to each of the communication devices 1 and 2 itself.

Figure 3:
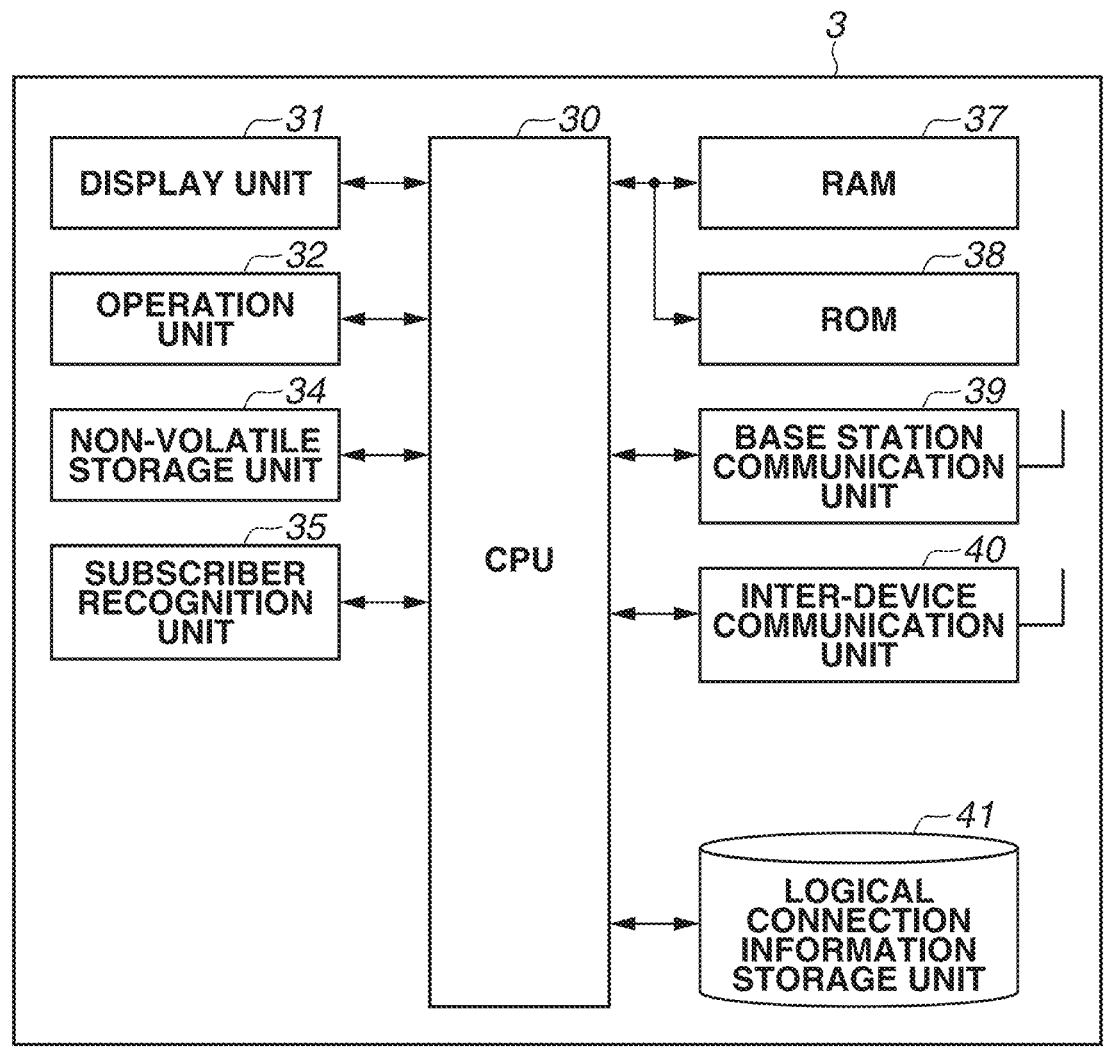
FIG. 3 is a block diagram illustrating an example of a configuration of a relay unit according to one embodiment.

FIG. 3 is a block diagram illustrating an example of a configuration of a relay unit 3 in FIG. 1.

In FIG. 3, the relay unit 3 includes a CPU 30, a display unit 31, an operation unit 32, a non-volatile storage unit 34, a subscriber recognition unit 35, a RAM 37, a ROM 38, a base station communication unit 39, an inter-device communication unit 40, and a logical connection information storage unit 41.

The CPU 30 is hardware that controls the entire relay unit 3. The display unit 31 is, for example, a liquid crystal monitor, an organic EL display, or a micro-LED display. The operation unit 32 is, for example, a key, a button, or a touch panel. The non-volatile storage unit 34 is, for example, a memory card or a USB memory.

The subscriber recognition unit 35 identifies a subscriber given the right to use the relay unit 3. The subscriber recognition unit 35 has a SIM function. The RAM 37 stores a program that is being executed by the CPU 30, or provides a work area for the CPU 30 to execute a program. The ROM 38 holds execution files for various programs and data used to execute the programs.

The base station communication unit 39 is an interface used for communication with the base station 4. The base station communication unit 39 is, for example, a wireless interface termed NR Uu. The inter-device communication unit 40 is an interface used for communication with the communication devices 1 and 2. The inter-device communication unit 40 is, for example, a wireless interface termed NR PC5. The logical connection information storage unit 41 stores logical connection information assigned to the relay unit 3.

Figure 4:
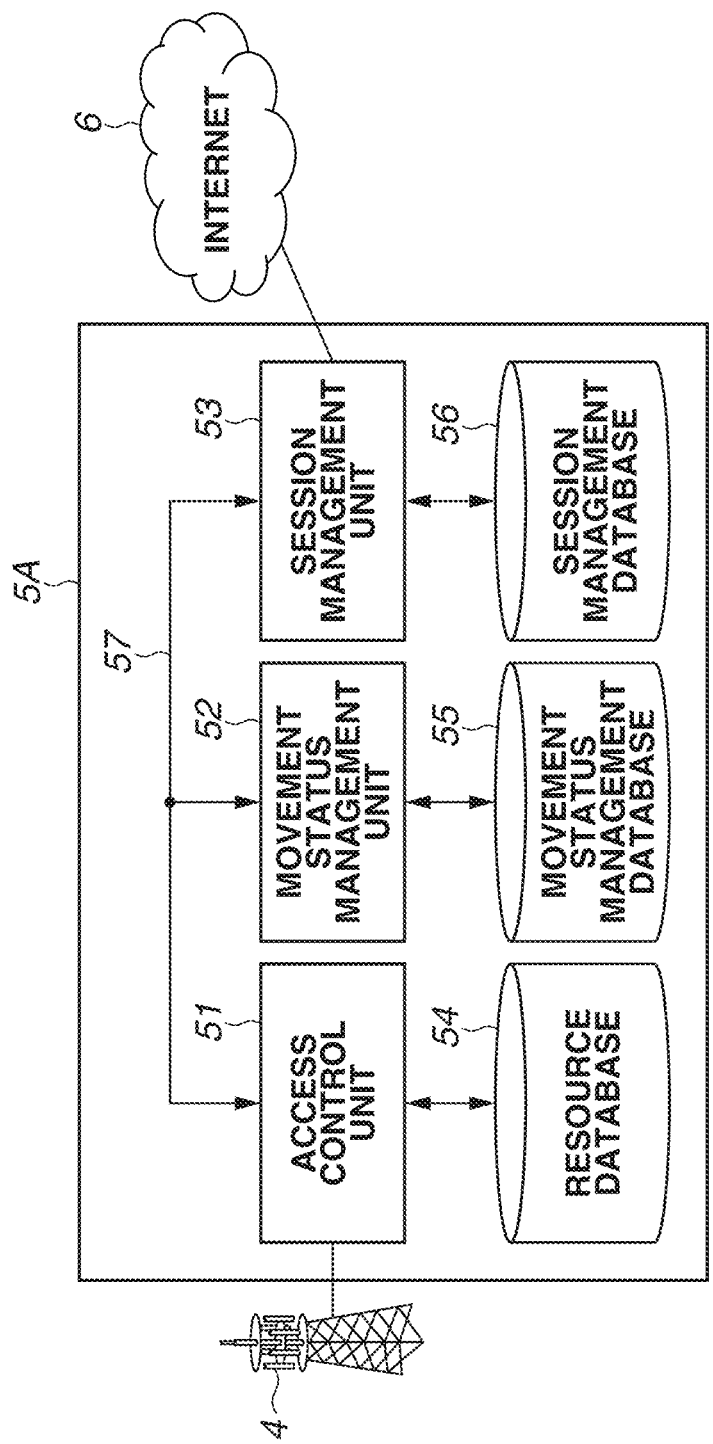
FIG. 4 is a block diagram illustrating an example of a configuration of a network-side management apparatus according to one embodiment.

FIG. 4 is a block diagram illustrating an example of a configuration of the network-side management apparatus in FIG. 1.

In FIG. 4, the network-side management apparatus 5A includes an access control unit 51, a movement status management unit 52, a session management unit 53, a resource database 54, a movement status management database 55, and a session management database 56.

The access control unit 51, the movement status management unit 52, and the session management unit 53 are connected with each other via a communication path 57. The access control unit 51 can access the resource database 54. The movement status management unit 52 can access the movement status management database 55. The session management unit 53 can access the session management database 56.

The access control unit 51 performs access control of a cell of which each base station 4 takes charge. The access control unit 51 has a next generation (NG)-radio access network (RAN) function. The "NG" as used herein is the fifth Generation (5G).

The resource database 54 stores resource information for a cell of which each base station 4 takes charge. The resource database 54 has a Radio Resource Control (RRC)-DB function.

The movement status management unit 52 manages the movement status of each of the communication devices 1 and 2. The movement status management unit 52 has an NG-Access Mobility Function (AMF) function.

The movement status management database 55 stores cell information regarding a cell where each of the communication devices 1 and 2 resides (also referred to as a "residence cell"). The movement status management database 55 has an AMF-DB function.

The session management unit 53 manages a protocol data unit (PDU) session for U-plane communication to the Internet 6. The session management unit 53 has an NG-Session Management Function (SMF) function.

The session management database 56 stores PDU session information regarding each of the communication devices 1 and 2. The session management database 56 has an SMF-DB function.

Figure 5:
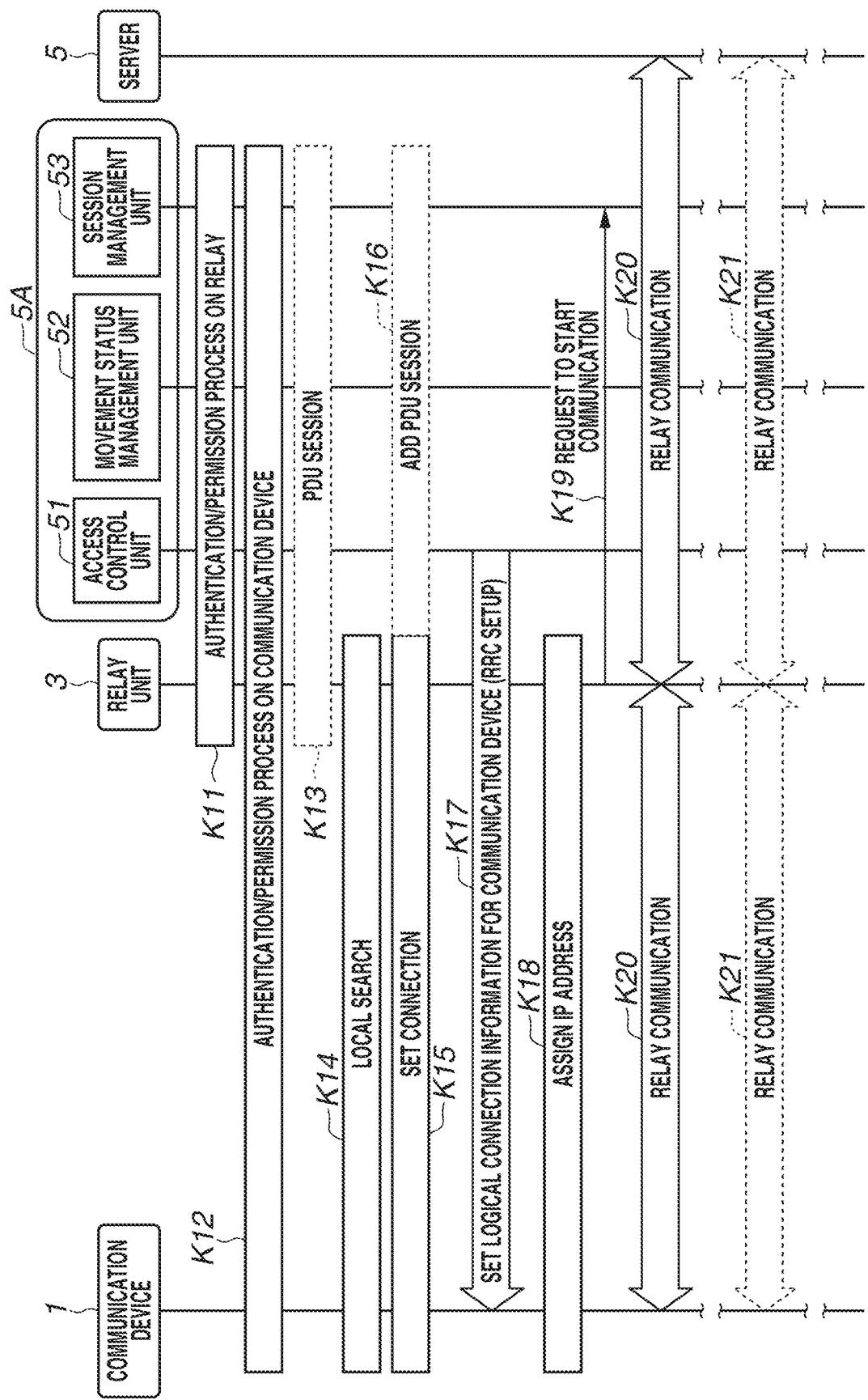
FIG. 5 is a sequence diagram illustrating a communication start sequence of a communication device in a communication system according to one embodiment.

FIG. 5 is a sequence diagram illustrating a communication start sequence of the communication device in the communication system in FIG. 1.

In FIG. 5, in steps K11 and K12, the network-side management apparatus 5A performs authentication/permission processes on the relay unit 3 and the communication device 1. If the authentication/permission processes are successful, then in step K13, the relay unit 3 sets only a network communication PDU session for the relay unit 3 itself.

Next, in step K14, the relay unit 3 performs a local search using the wireless communication medium WA for inter-apparatus direct communication. At this time, if the relay unit 3 recognizes a request to perform network communication from the communication device 1, then in step K15, the relay unit 3 sets a wireless connection for the wireless communication medium WA for inter-apparatus direct communication between the communication device 1 and the relay unit 3. In step K16, in addition to relay unit 3 the connection between the communication device 1 and the relay unit 3, the relay unit 3 additionally sets a PDU session for the communication device 1.

Next, if the PDU session is additionally set, then in step K17, the network-side management apparatus 5A sets logical connection information such as an IP address to the communication device 1 (RRC setup).

If the communication device 1 receives the logical connection information, then in steps K18 and K19, using the received logical connection information, the communication device 1 requests via the relay unit 3 the network-side management apparatus 5A to start a U-plane communication path.

If the network-side management apparatus 5A receives the request to start a U-plane communication path, then in steps K20 and K21, the network-side management apparatus 5A opens a port for network communication, thereby starting network communication between the communication device 1 and a server 5 via the relay unit 3. The server 5 is, for example, an application server.

If a cell to which the relay unit 3 is connected changes due to the movement of the relay unit 3, then to enable the communication device 1 to resume network communication, the logical connection information for the communication device 1 needs to be updated in response to the change of the cell to which the relay unit 3 is connected.

Figure 6:
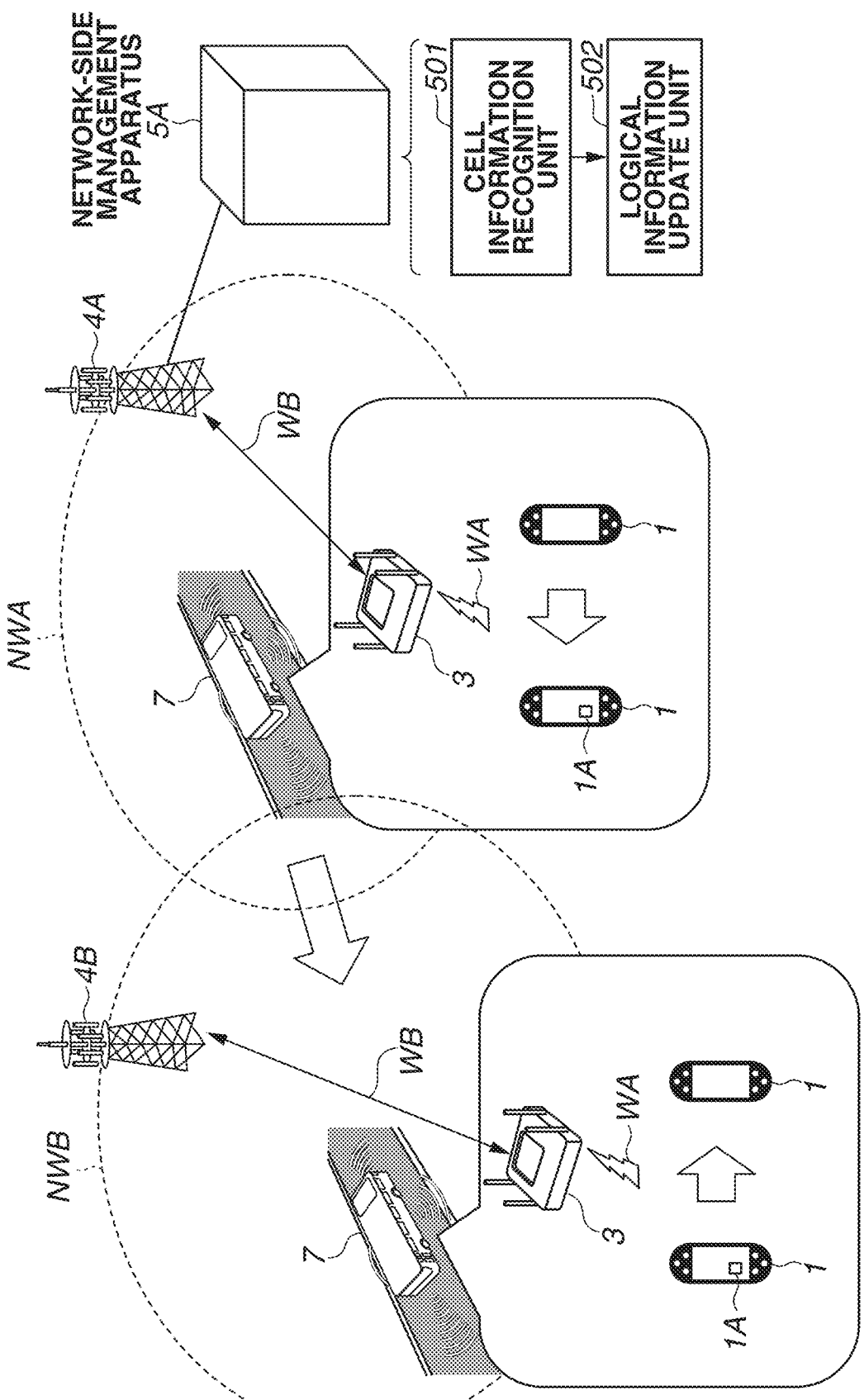
FIG. 6 is a diagram illustrating a state that may arise in a case where logical connection information is not shared when cell information managed by a relay unit changes.

FIG. 6 is a diagram illustrating a state that may arise in a case where logical connection information is not shared when cell information managed by the relay unit 3 in FIG. 1 changes.

In FIG. 6, a base station 4A takes charge of communication inside a cell NWA, and a base station 4B takes charge of communication inside a cell NWB. In a bus 7, the online game service using the communication device 1 as a mobile game apparatus and the relay unit 3 is provided.

According to the progress status of the game scenario, the communication device 1 operates by switching a network communication operation state and a local communication operation state. At this time, if the bus 7 is present inside the cell NWA, the communication device 1 performing a local communication operation stores, in the communication device 1 itself, logical connection information IA used for network communication inside the cell NWA, thereby smoothly switching the communication operation states.

Suppose that the bus 7 moves from inside the cell NWA to inside the cell NWB. At this time, the relay unit 3 monitors a channel that uses the wireless communication medium WB, thereby recognizing a change in cell information and updating logical connection information used for network communication inside the cell NWA to logical connection information used for network communication inside the cell NWB. On the other hand, if the relay unit 3 does not monitor the channel that uses the wireless communication medium WB to save power, the communication device 1 cannot recognize a change in the cell information. Thus, even in a case where the bus 7 moves from inside the cell NWA to inside the cell NWB, the communication device 1 continues to hold the logical connection information used for network communication inside the cell NWA. Thus, the communication device 1 fails in resuming network communication and performs a re-setting process for re-setting the logical connection information used for network communication inside the cell NWB. In the re-setting process, the processes of steps K15 to K19 in FIG. 5 are executed, and it may take about several seconds until the resumption of network communication.

Figure 7:
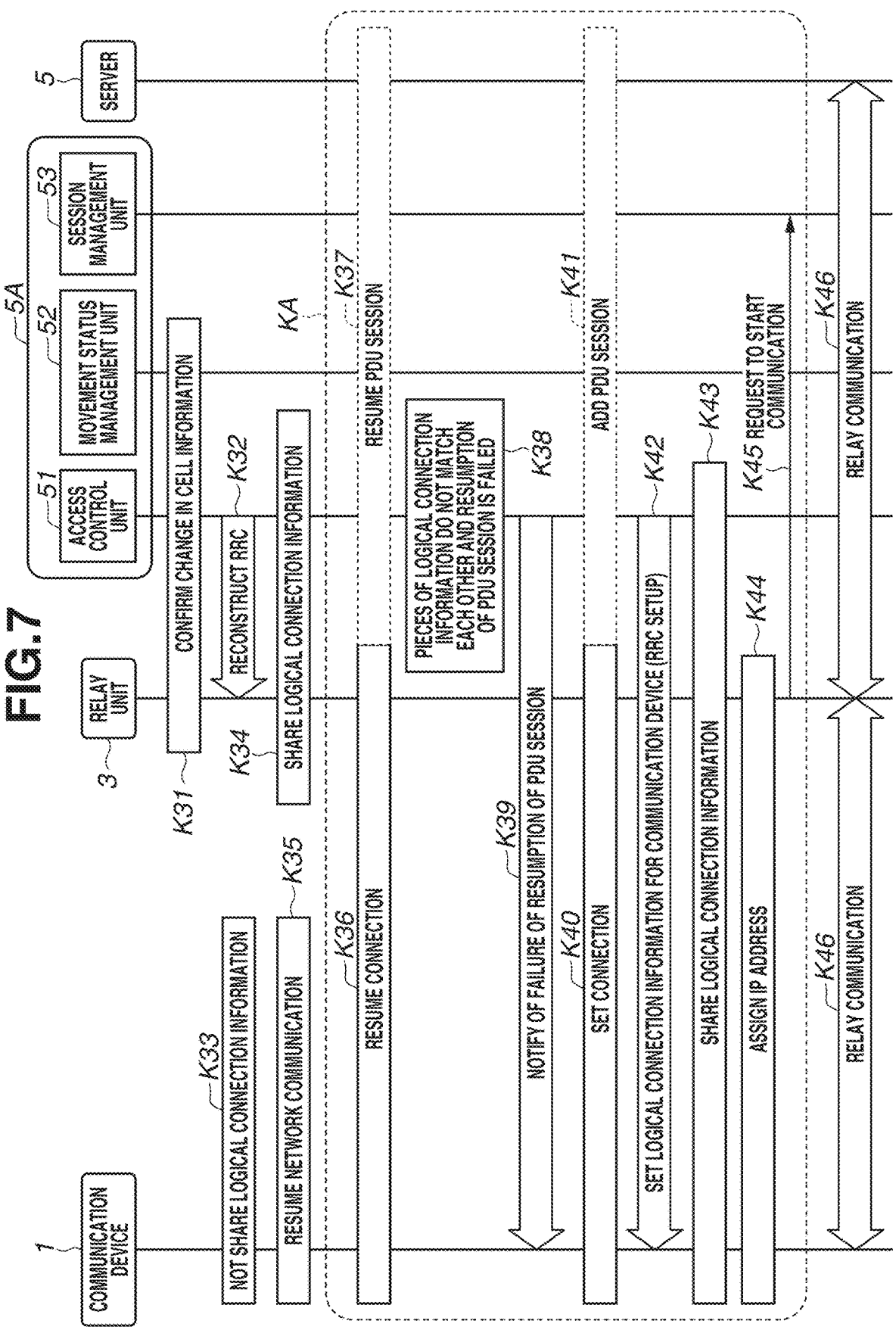
FIG. 7 is a sequence diagram illustrating a communication resumption sequence of a communication device when logical connection information is not shared.

FIG. 7 is a sequence diagram illustrating a communication resumption sequence of a communication device 1 when logical connection information is not shared.

Suppose that in FIG. 7, a residence cell of the bus 7 changes to the cell NWB due to the movement of the bus 7 in FIG. 6. At this time, in the relay unit 3, the base station communication unit 39 for wireless base station communication is in an operating state, and therefore, in step K31, the relay unit 3 recognizes a change in cell information and shares the change in the cell information with the network-side management apparatus 5A. Thus, in steps K32 and K34, the relay unit 3 updates logical connection information to logical connection information for the cell NWB.

On the other hand, in the communication device 1, the base station communication unit 19 for wireless base station communication is not in an operating state, and therefore, the communication device 1 cannot recognize the change in the cell information. Thus, in step K33, the communication device 1 continues to store logical connection information for the cell NWA, and does not share logical connection information with the relay unit 3.

As a result, after moving to the cell NWB, in step K35, the communication device 1 starts a resumption process KA for resuming network communication using the logical connection information for the cell NWA.

In the resumption process KA, in step K36, the relay unit 3 resumes a connection between the communication device 1 and the relay unit 3 using the wireless communication medium WA for inter-apparatus direct communication. Then, in step K37, the relay unit 3 resumes a PDU session for the communication device 1. At this time, in step K38, the logical connection information for the cell NWA used by the communication device 1 cannot be used in the cell NWB, and thus, the network-side management apparatus 5A fails in resuming network communication. Then, in step K39, the network-side management apparatus 5A notifies the communication device 1 of the failure of the resumption.

If the resumption of network communication is failed, then in steps K40 to K45, processes similar to those of steps K15 to K19 in FIG. 5 are executed. Then, in step K46, the network-side management apparatus 5A opens a port for network communication, thereby resuming network communication via the relay unit 3 with the communication device 1.

In the resumption process KA, it may take about several seconds until the resumption of network communication. To shorten the time required until the resumption of network communication, the network-side management apparatus 5A updates the logical connection information for the communication device 1 together with an update of the logical connection information for the relay unit 3.

Figure 8:
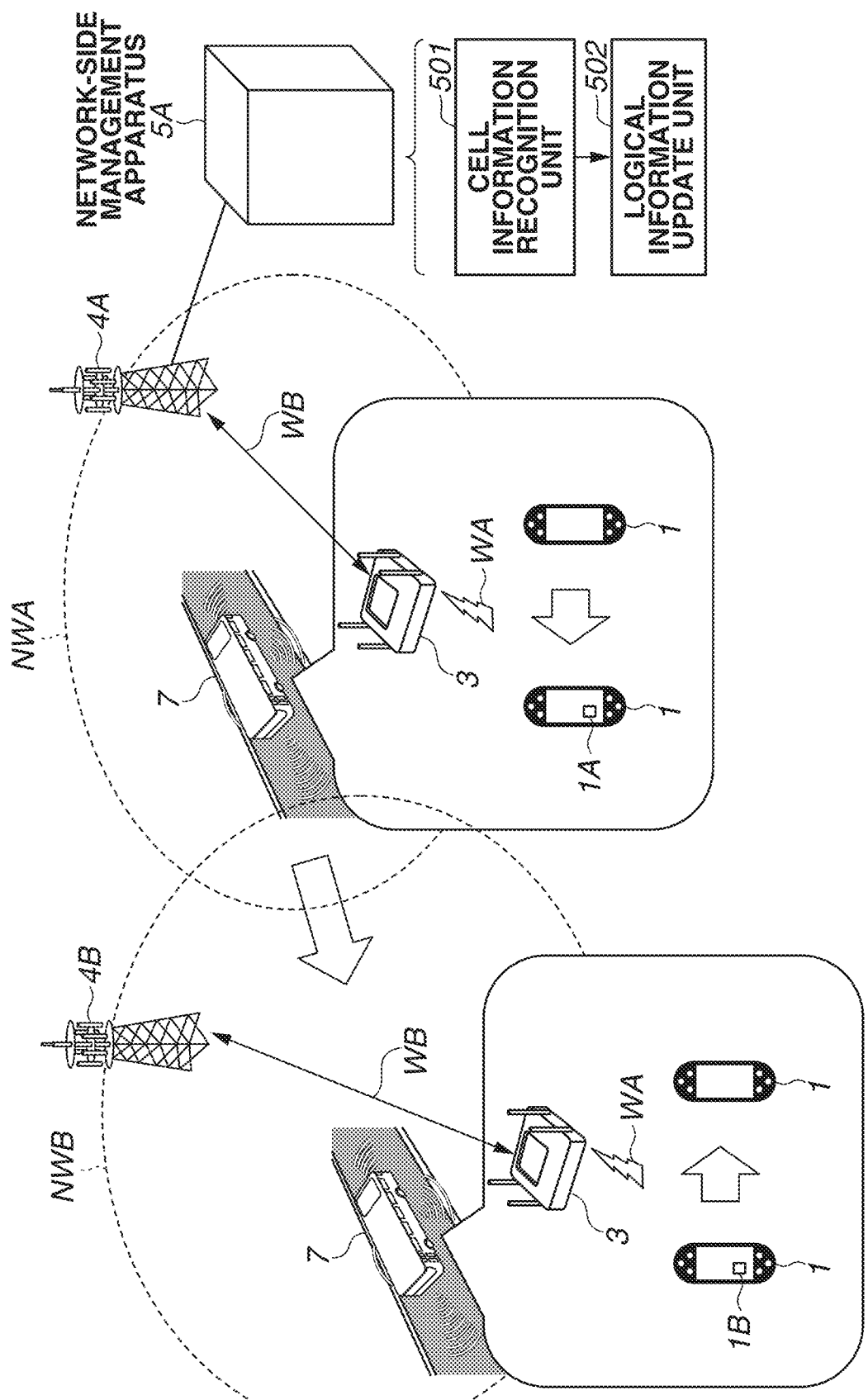
FIG. 8 is a diagram illustrating a state that may arise in a case where logical connection information is shared when cell information managed by a relay unit changes.

FIG. 8 is a diagram illustrating a state that may arise in a case where logical connection information is shared when cell information managed by the relay unit 3 in FIG. 1 changes.

In FIG. 8, if the bus 7 is present inside the cell NWA, the communication device 1 performing a local communication operation stores, in the communication device 1 itself, the logical connection information IA used for network communication inside the cell NWA.

If the bus 7 moves from inside the cell NWA to inside the cell NWB, the cell information recognition unit 501 recognizes a change in cell information managed by the relay unit 3. Then, based on an update of logical connection information used for access between the relay unit 3 and the base station 4, the logical information update unit 502 updates the logical connection information IA for the cell NWA for the communication device 1 connected to the relay unit 3 to logical connection information IB for the cell NWB. Then, after moving to the cell NWB, the communication device 1 starts a resumption process for resuming network communication using the logical connection information for the cell NWB. At this time, the communication device 1 holds the logical connection information for the cell NWB that can be used in the cell NWB, and thus, the network-side management apparatus 5A succeeds in resuming network communication. Thus, after the communication device 1 moves to the cell NWB, the network-side management apparatus 5A can resume network communication without performing the resumption process KA in FIG. 7. Accordingly, it only takes about several hundreds of milliseconds until the resumption of network communication.

Figure 9:
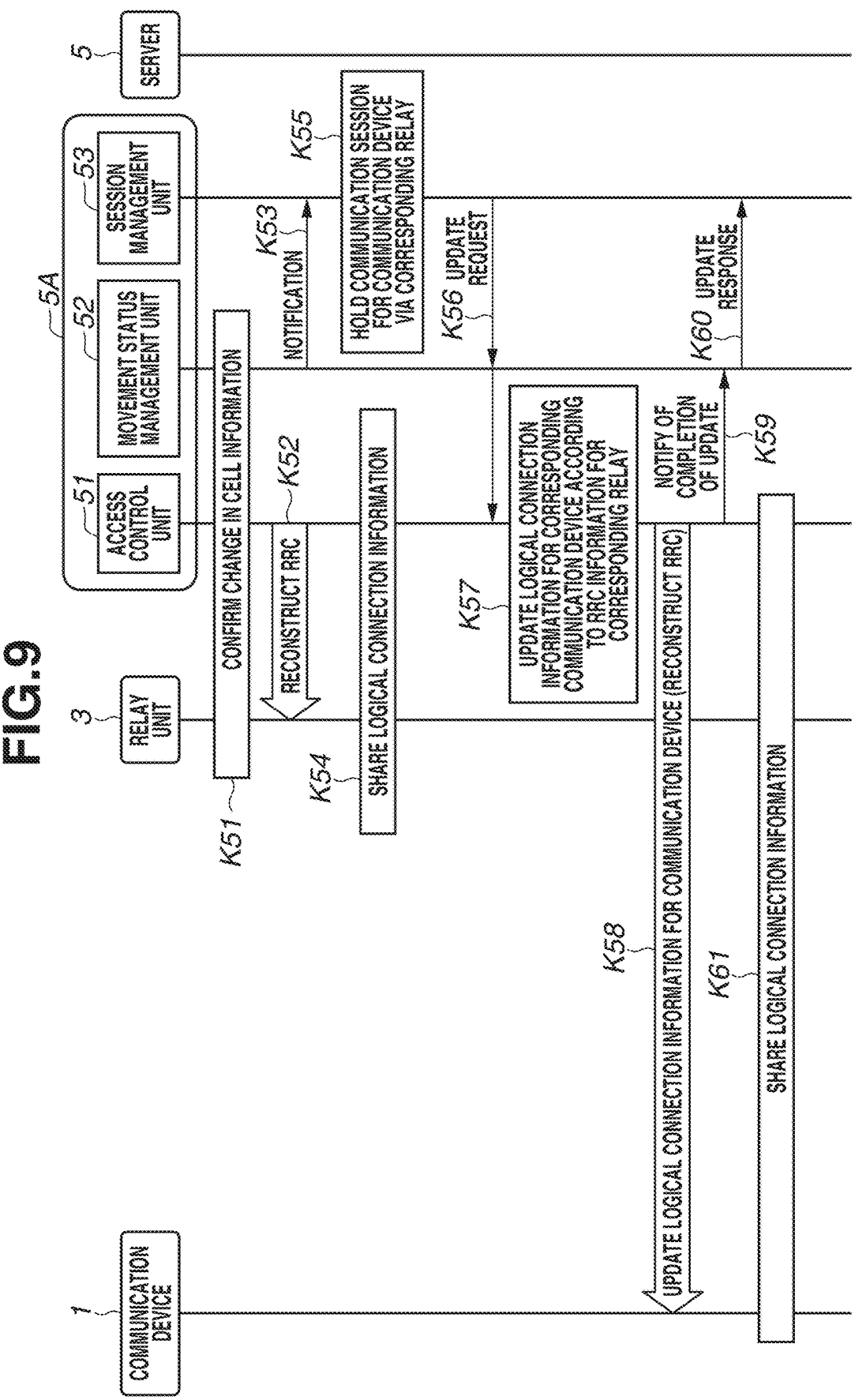
FIG. 9 is a sequence diagram illustrating an update sequence of logical connection information before resumption of communication by a communication device according to the first exemplary embodiment.

FIG. 9 is a sequence diagram illustrating an update sequence of logical connection information before the resumption of communication by the communication device 1 according to the first exemplary embodiment.

Suppose that in FIG. 9, a residence cell of the bus 7 changes to the cell NWB due to the movement of the bus 7 in FIG. 8. At this time, in the relay unit 3, the base station communication unit 39 for wireless base station communication is in an operating state, and thus, in step K51, the relay unit 3 recognizes a change in cell information and shares the change in the cell information with the network-side management apparatus 5A. Thus, in steps K52 and K54, the relay unit 3 updates logical connection information to logical connection information for the cell NWB.

If the network-side management apparatus 5A recognizes a change in cell information, and the device type in which the change in the cell information occurs is the relay unit 3, then in step K53, the movement status management unit 52 notifies the session management unit 53 of the change in the cell information.

Next, in step K55, if the session management unit 53 holds a communication session for the communication device 1 via the relay unit 3, then in step K56, the session management unit 53 notifies the access control unit 51 of a request to update logical connection information for the communication device 1.

Next, in steps K57 and K58, based on the status of the change in the cell information managed by the relay unit 3, the access control unit 51 updates the logical connection information for the communication device 1.

Next, in step K61, the access control unit 51 confirms that the update of the logical connection information for the communication device 1 is completed, and the network-side management apparatus 5A and the communication device 1 share the logical connection information.

In step K59, the access control unit 51 notifies the movement status management unit 52 of the completion of the update of the logical connection information. In step K60, the movement status management unit 52 returns to the session management unit 53 a response to the request to update the logical connection information for the communication device 1.

FIG. 10 is a diagram illustrating an example of an information management table stored in the session management database of the network-side management apparatus in FIG. 4.

In FIG. 10, this information management table includes the entries of a management target relay ID, a PDU connection number, a target communication device ID, assigned IP information, and a user ID. To a single management target relay ID, a plurality of PDU connection numbers can be assigned. To a single PDU connection number, a single target communication device ID, a single piece of assigned IP information, and a single user ID are assigned. Each of the management target relay ID and the target communication device ID is, for example, an International Mobile Equipment Identifier (IMEI).

FIG. 11 is a diagram illustrating an example of an information management table stored in the movement status management database of the network-side management apparatus in FIG. 4.

In FIG. 11, this information management table includes the entries of a management target communication device ID and a currently connected base station ID (IP information). To a single management target communication device ID, a single currently connected base station ID is assigned. The management target communication device ID is, for example, an IMEI.

Figure 12:
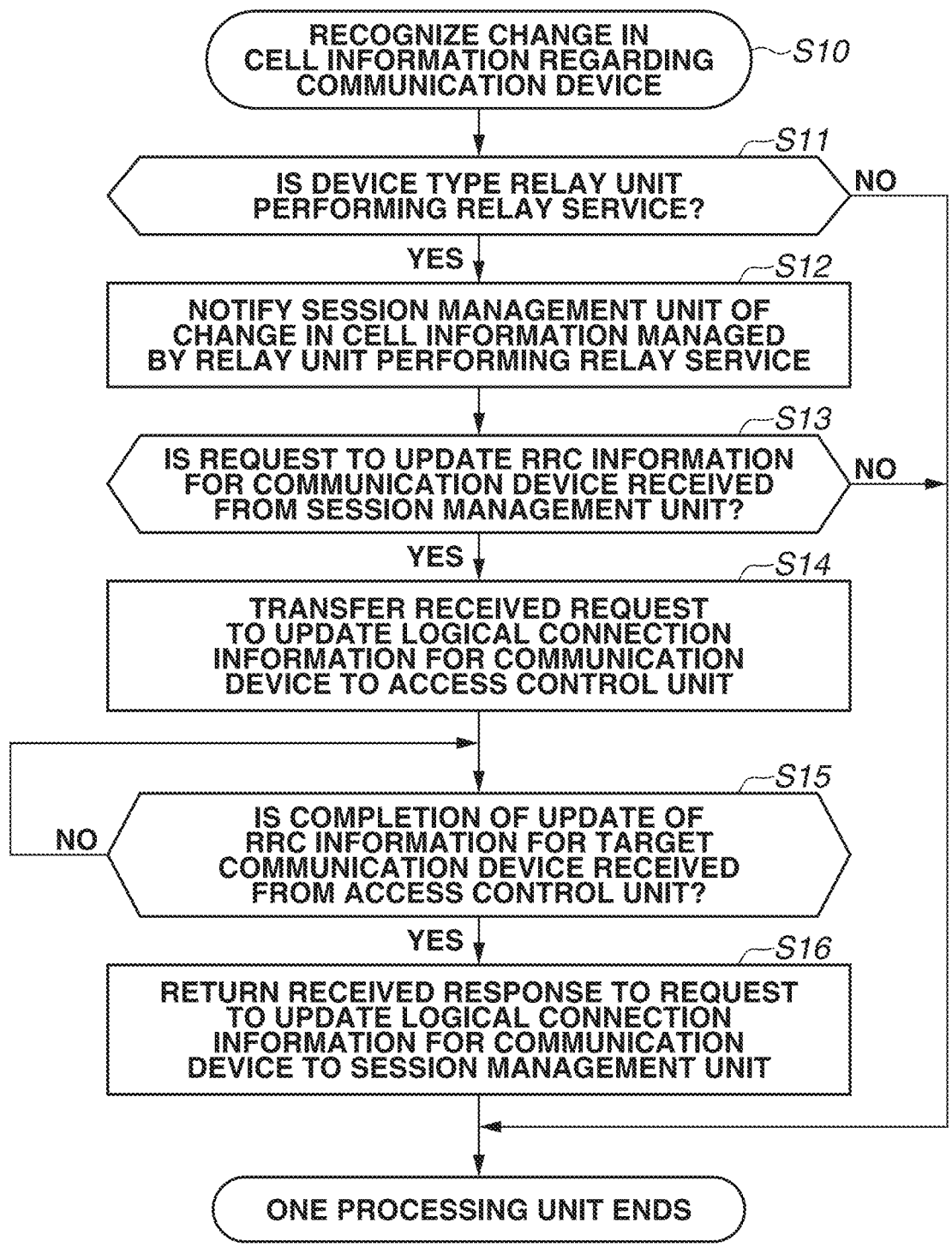
FIG. 12 is a flowchart illustrating a logical connection information update process performed by a movement status management unit of a network-side management apparatus according to one embodiment.

FIG. 12 is a flowchart illustrating a logical connection information update process performed by the movement status management unit 52 of the network-side management apparatus in FIG. 4.

In FIG. 12, in step S10, if the network-side management apparatus 5A recognizes a change in cell information, the movement status management unit 52 starts a logical connection information update process.

Then, in step S11, the movement status management unit 52 determines whether the device type in which the change in the cell information occurs is the relay unit 3. If the device type is the relay unit 3 (YES in step S11), the processing proceeds to step S12. In step S12, the movement status management unit 52 notifies the session management unit 53 of the change in the cell information due to the movement of the relay unit 3 performing a relay service. If, on the other hand, the device type is not the relay unit 3 (NO in step S11), the movement status management unit 52 ends the logical connection information update process.

Next, in step S13, the movement status management unit 52 determines whether a request to update RRC information for the communication device 1 is received from the session management unit 53. If the request to update the RRC information for the communication device 1 is received (YES in step S13), the processing proceeds to step S14. In step S14, the movement status management unit 52 transfers the request to update the logical connection information for the communication device 1 to the access control unit 51. At this time, the movement status management unit 52 refers to the information management table in FIG. 10 and finalizes, from among at least one or more access control units 51, an access control unit 51 that manages logical connection information regarding a cell to which the relay unit 3 moves. On the other hand, if the request to update the RRC information for the communication device 1 is not received (NO in step S13), the movement status management unit 52 ends the logical connection information update process.

Next, in step S15, the movement status management unit 52 determines whether the completion of the update of the RRC information for the communication device 1 as the update target is received from the access control unit 51. If the completion of the update of the RRC information for the communication device 1 as the update target is received (YES in step S15), the processing proceeds to step S16. In step S16, the movement status management unit 52 returns the received response to the request to update the logical connection information for the communication device 1 to the session management unit 53. On the other hand, if the completion of the update of the RRC information for the communication device 1 as the update target is not received (NO in step S15), the movement status management unit 52 repeats the process of step S15 until the completion of the update of the RRC information for the communication device 1 as the update target is received.

Figure 13:
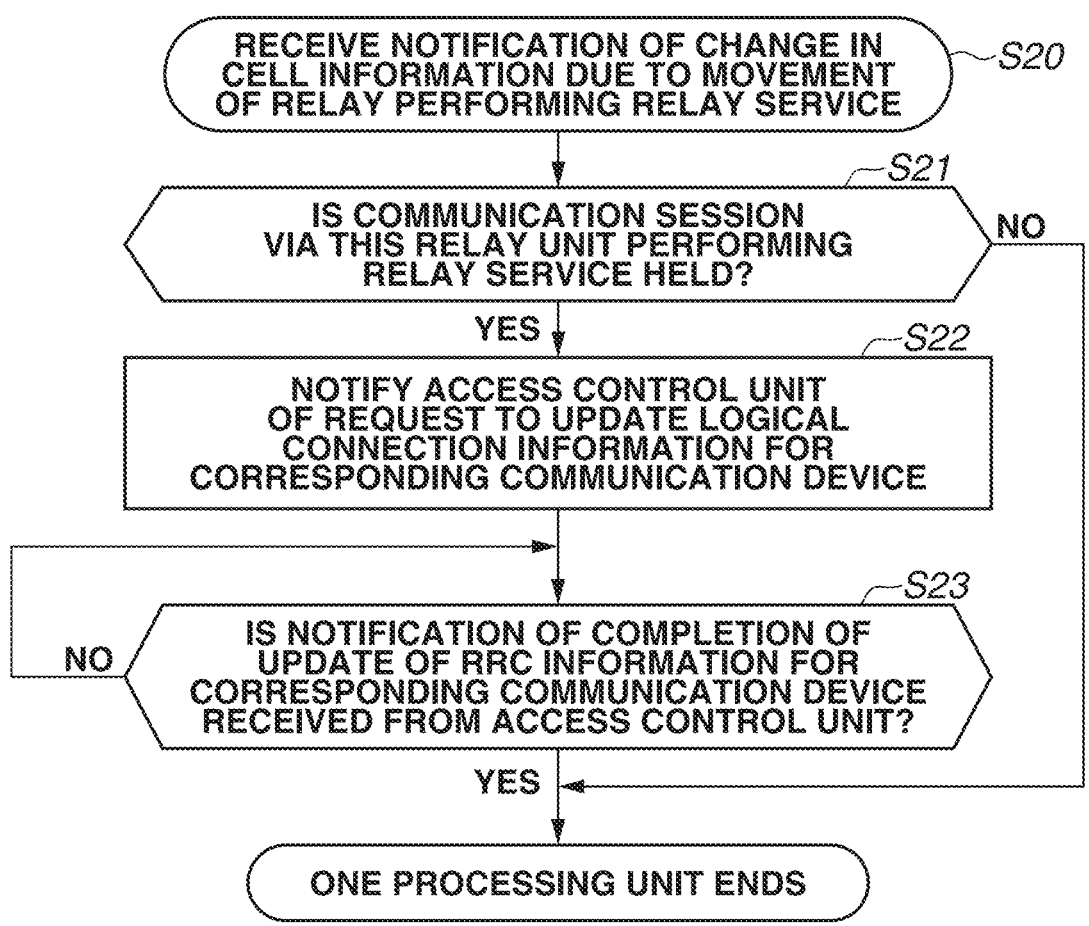
FIG. 13 is a flowchart illustrating a logical connection information update process performed by a session management unit of a network-side management apparatus according to one embodiment.

FIG. 13 is a flowchart illustrating a logical connection information update process performed by the session management unit 53 of the network-side management apparatus in FIG. 4.

In FIG. 13, in step S20, if a notification of a change in cell information due to the movement of the relay unit 3 is received from the movement status management unit 52, the session management unit 53 starts a logical connection information update process.

Then, in step S21, the session management unit 53 refers to the information storage table information in FIG. 10 and determines whether a communication session via the relay unit 3 performing a relay service is held. If the communication session via the relay unit 3 is held (YES in step S21), the processing proceeds to step S22. In step S22, the session management unit 53 notifies the access control unit 51 of a request to update logical connection information for the corresponding communication device 1. On the other hand, if the communication session via the relay unit 3 is not held (NO in step S21), the session management unit 53 ends the logical connection information update process.

Next, in step S23, the session management unit 53 determines whether a notification of the completion of the update of the RRC information for the communication device 1 as the update target is received from the access control unit 51. If the notification of the completion of the update of the RRC information for the communication device 1 as the update target is received (YES in step S23), the session management unit 53 ends the logical connection information update process. On the other hand, if the notification of the completion of the update of the RRC information for the communication device 1 as the update target is not received (NO in step S23), the session management unit 53 repeats the process of step S23 until the notification of the completion of the update of the RRC information for the communication device 1 as the update target is received.

Figure 14:
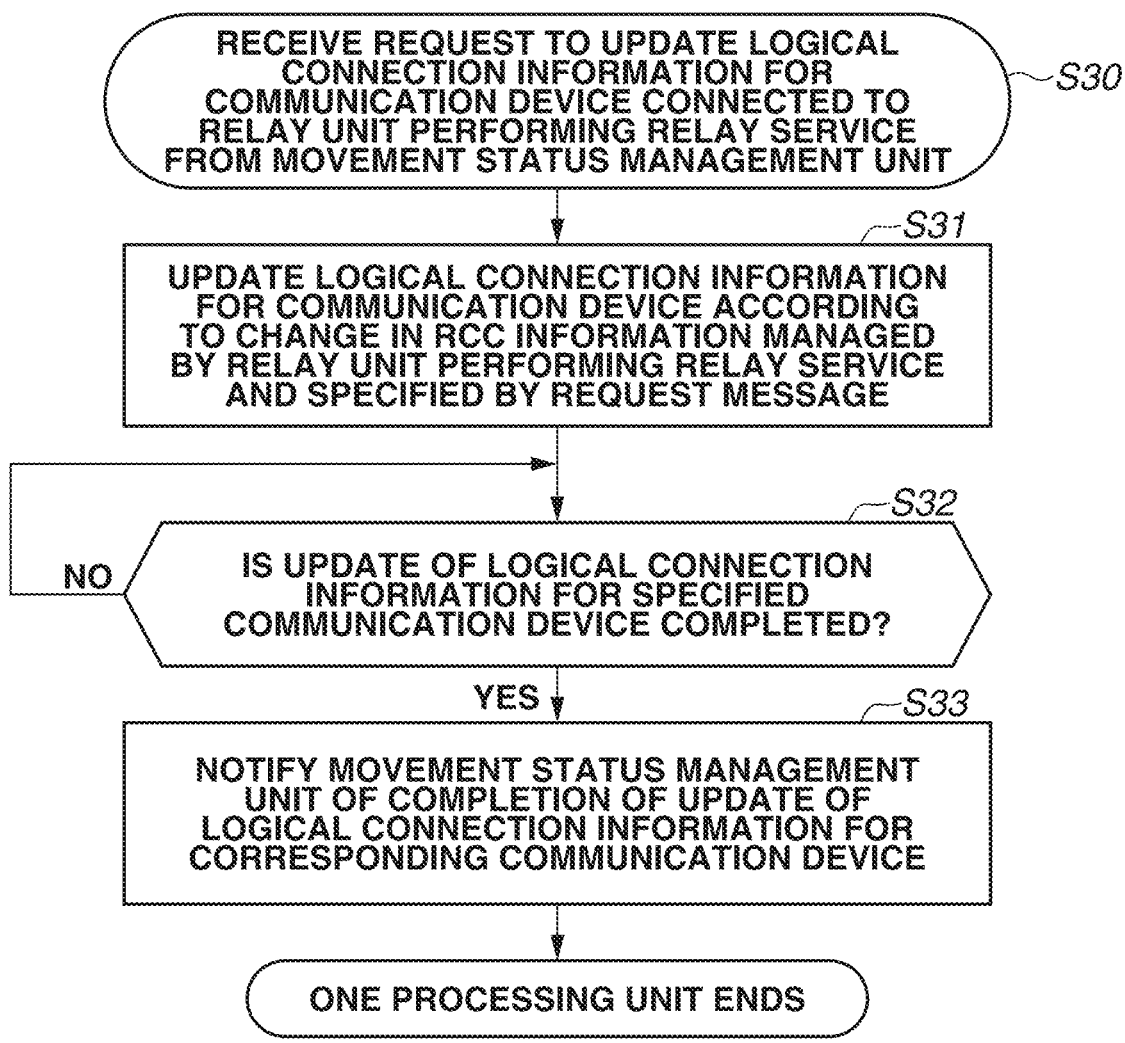
FIG. 14 is a flowchart illustrating a logical connection information update process performed by an access control unit of a network-side management apparatus according to one embodiment.

FIG. 14 is a flowchart illustrating a logical connection information update process performed by the access control unit 51 of the network-side management apparatus in FIG. 4.

In FIG. 14, in step S30, if a notification of a request to update logical connection information for the communication device 1 connected to the relay unit 3 performing a relay service is received from the movement status management unit 52, the access control unit 51 starts a logical connection information update process.

Then, after confirming that the state of the wireless function of the specified communication device 1 is RRC_CONNECTED, which is a normal communication state, then in step S31, the access control unit 51 updates the logical connection information for the communication device 1 according to the status of a change in cell information managed by the relay unit 3.

Next, in step S32, the access control unit 51 determines whether the update of the logical connection information for the communication device 1 is completed. If the update of the logical connection information for the communication device 1 is completed (YES in step S32), the processing proceeds to step S33. In step S33, the access control unit 51 notifies the movement status management unit 52 of the completion of the update of the logical connection information for the communication device 1, and ends the logical connection information update process. On the other hand, if the update of the logical connection information for the communication device 1 is not completed (NO in step S32), the access control unit 51 repeats the process of step S32 until the update of the logical connection information for the communication device 1 is completed.

Figure 15:
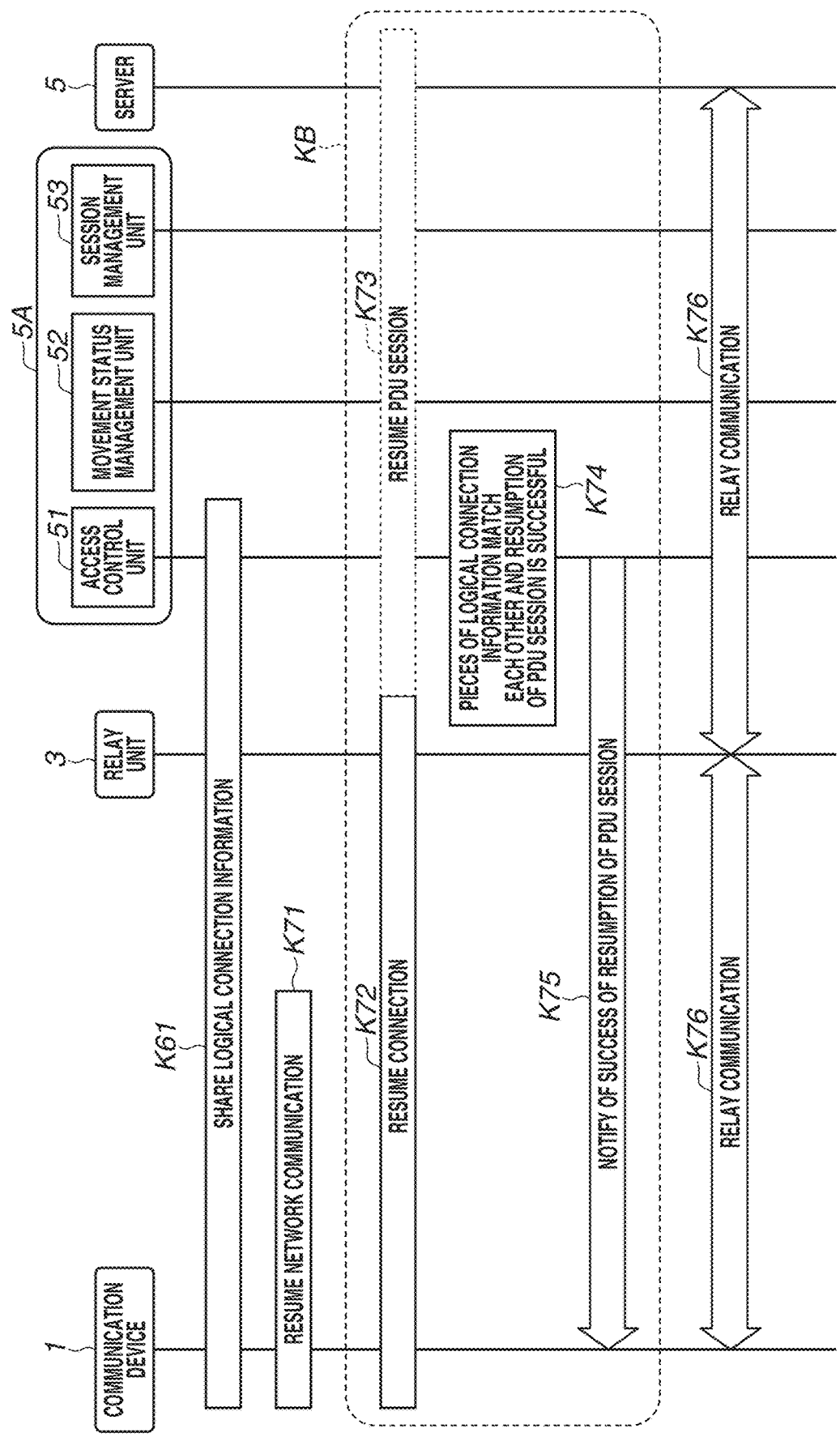
FIG. 15 is a sequence diagram illustrating a communication resumption sequence of each of the communication devices when logical connection information is shared.

FIG. 15 is a sequence diagram illustrating a communication resumption sequence of a communication device when logical connection information is shared.

Suppose that in FIG. 15, in step K61, logical connection information is shared by the network-side management apparatus 5A and the communication device 1 as a result of the sequence in FIG. 9.

At this time, in step K71, if the communication device 1 resumes network communication, the communication device 1 starts a resumption process KB using the logical connection information for the cell NWB.

In the resumption process KB, in step K72, the relay unit 3 resumes a connection between the communication device 1 and the relay unit 3 using the wireless communication medium WA for inter-apparatus direct communication. Then, in step K73, the relay unit 3 resumes a PDU session for the communication device 1. At this time, in step K74, the communication device 1 holds the logical connection information for the cell NWB that can be used in the cell NWB, and thus, the network-side management apparatus 5A succeeds in resuming network communication. Then, in step K75, the network-side management apparatus 5A notifies the communication device 1 of the success of the resumption. Then, in step K76, the network-side management apparatus 5A opens a port for network communication, thereby resuming network communication via the relay unit 3 with the communication device 1.

At this time, in the resumption process KB for resuming network communication, it is not necessary to perform a reassignment process for reassigning logical connection information. Thus, it is possible to shorten the time required until the resumption of network communication as compared with the resumption process KA in FIG. 7.

As described above, according to the first exemplary embodiment, a relay unit recognizes a change in cell information due to the movement of the relay unit itself or an increase or decrease in the number of resident apparatuses. Then, the relay unit updates the cell information, and a wireless network management apparatus receives the update of the information from the relay unit and also updates logical connection information for a communication device connected to the relay unit. In this way, before the resumption of suspended network wireless communication, the wireless network management apparatus can update logical connection information regarding a residence cell of the communication device. Thus, the wireless network management apparatus can prevent the occurrence of a discrepancy in the logical connection information regarding the residence cell when network wireless communication is resumed. Thus, it is not necessary to reassign logical connection information when suspended network wireless communication is resumed. As a result, it is possible to shorten the time required until the resumption of network wireless communication.

In a second exemplary embodiment, if the communication device 1 is in a suspended state, the wireless network-side management apparatus 5B causes the communication device 1 to transition to an activated state, and then also updates logical connection information for the communication device 1 connected to the relay unit 3. The suspended state is also referred to as "RRC_INACTIVE", and the activated state is also referred to as "RRC_CONNECTED".

Figure 16:
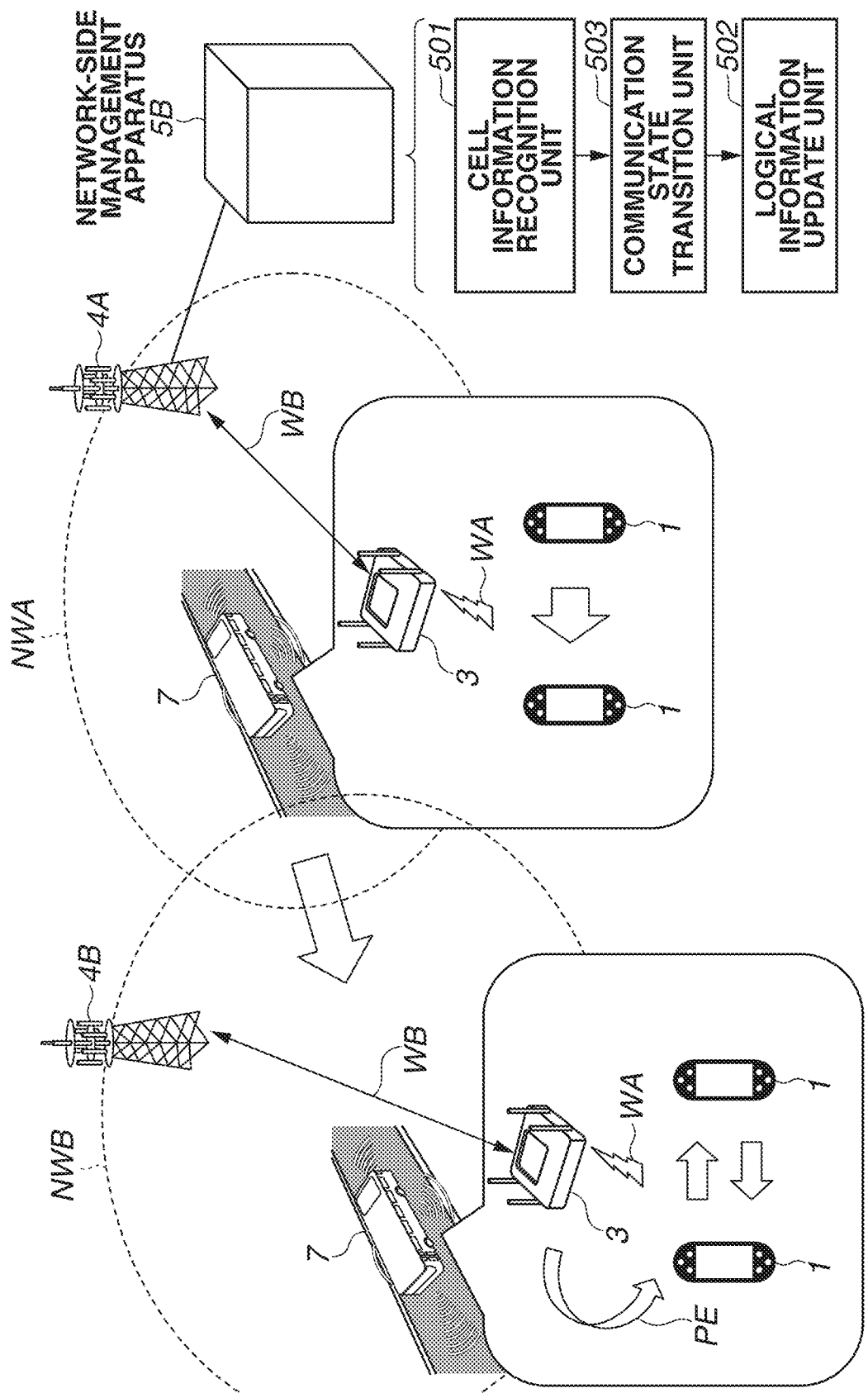
FIG. 16 is a diagram illustrating a method for sharing logical connection information according to a second exemplary embodiment.

FIG. 16 is a diagram illustrating a method for sharing logical connection information according to the second exemplary embodiment.

In FIG. 16, this communication system includes a network-side management apparatus 5B instead of the network-side management apparatus 5A in FIG. 6. The network-side management apparatus 5B further includes a communication state transition unit 503 in addition to the cell information recognition unit 501 and the logical information update unit 502. The network-side management apparatus 5B has a hardware configuration similar to that of the network-side management apparatus 5A in FIG. 4. In a case where the communication device 1 for which logical connection information is updated while the communication device 1 is connected to the relay unit 3 is in a power saving communication state, the communication state transition unit 503 causes the communication device 1 to transition to a normal communication state. At this time, the communication state transition unit 503 can shift the communication device 1 to RRC_INACTIVE, thereby causing the communication device 1 to transition to the power saving communication state. The communication state transition unit 503 can shift the communication device 1 to RRC_CONNECTED, thereby causing the communication device 1 to transition to the normal communication state.

The relay unit 3 always monitors an informing signal of the base station 4, thereby recognizing a change in cell information. If the relay unit 3 recognizes a change in the cell information, a wireless communication function unit returns to an activated state, and logical connection information is updated.

The communication device 1 operates as a mobile game apparatus to which the online game service is provided. At this time, to save power, the communication device 1 switches the suspended state and the activated state based on the operation state of the communication device 1.

The communication device 1 monitors an informing signal transmitted from the relay unit 3, and does not monitor an informing signal transmitted from the base station 4. Thus, if the communication device 1 moves in the same direction and at the same speed as the relay unit 3, the communication device 1 cannot recognize a change in the cell information.

If the bus 7 moves from inside the cell NWA to inside the cell NWB, the cell information recognition unit 501 recognizes a change in cell information managed by the relay unit 3. Next, the communication state transition unit 503 determines whether the communication device 1 connected to the relay unit 3 is in the RRC_CONNECTED state. If the communication device 1 is not in the RRC_CONNECTED state, the communication state transition unit 503 transmits a paging message (incoming call message) PE to the communication device 1 via the relay unit 3, thereby shifting the communication device 1 to the RRC_CONNECTED state. Then, based on an update of logical connection information used for access between the relay unit 3 and the base station 4, the logical information update unit 502 updates logical connection information IA for the cell NWA for the communication device 1 connected to the relay unit 3 to logical connection information IB for the cell NWB. If the communication state transition unit 503 recognizes that communication using a wireless communication circuit by the communication device 1 for which the logical connection information is updated is not performed for a certain period, the communication state transition unit 503 urges the communication device 1 to transition to the power saving communication state.

Figure 17:
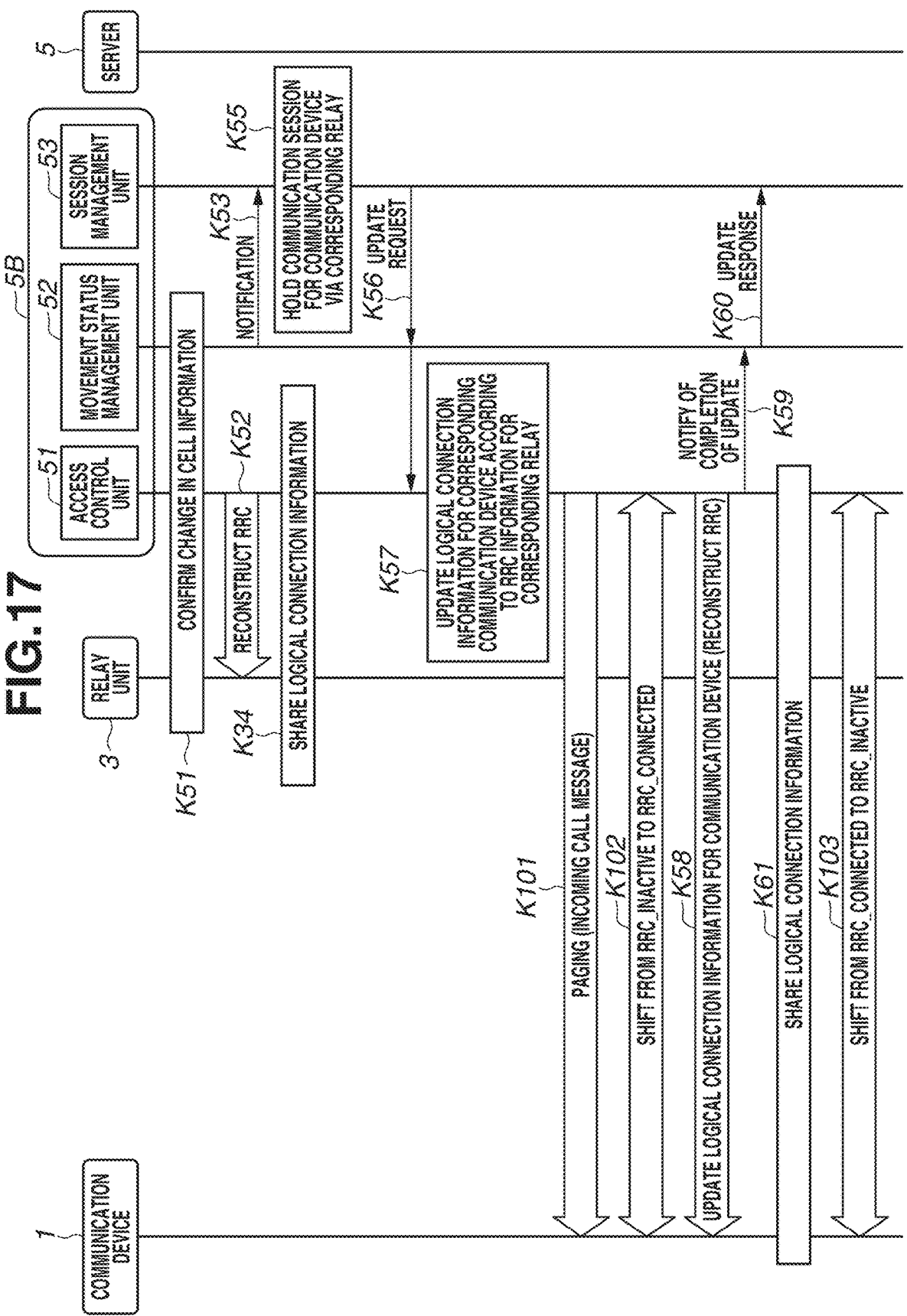
FIG. 17 is a sequence diagram illustrating an update sequence of logical connection information before resumption of communication by a communication device according to the second exemplary embodiment.

FIG. 17 is a sequence diagram illustrating an update sequence of logical connection information before the resumption of communication by the communication device according to the second exemplary embodiment.

In the update sequence in FIG. 17, the processes of steps K101 to K103 are added to the update sequence in FIG. 9. In the update sequence in FIG. 17, after the process of step K57, then in step K101, if a wireless communication function unit of the communication device 1 is not RRC_CONNECTED, the network-side management apparatus 5B transmits a paging message to the communication device 1. If the communication device 1 receives the paging message, then in step K102, the communication device 1 shifts from RRC_INACTIVE to RRC_CONNECTED.

In step K61, if logical connection information is shared by the network-side management apparatus 5A and the communication device 1, then in step K103, the network-side management apparatus 5B shifts the communication device 1 from RRC_CONNECTED to RRC_INACTIVE.

In this way, while enabling the communication device 1 to perform power saving control by controlling the state of the wireless communication function unit, the network-side management apparatus 5B can update logical connection information for the communication device 1 connected to the relay unit 3 together with an update of logical connection information for the relay unit 3.

Figure 18:
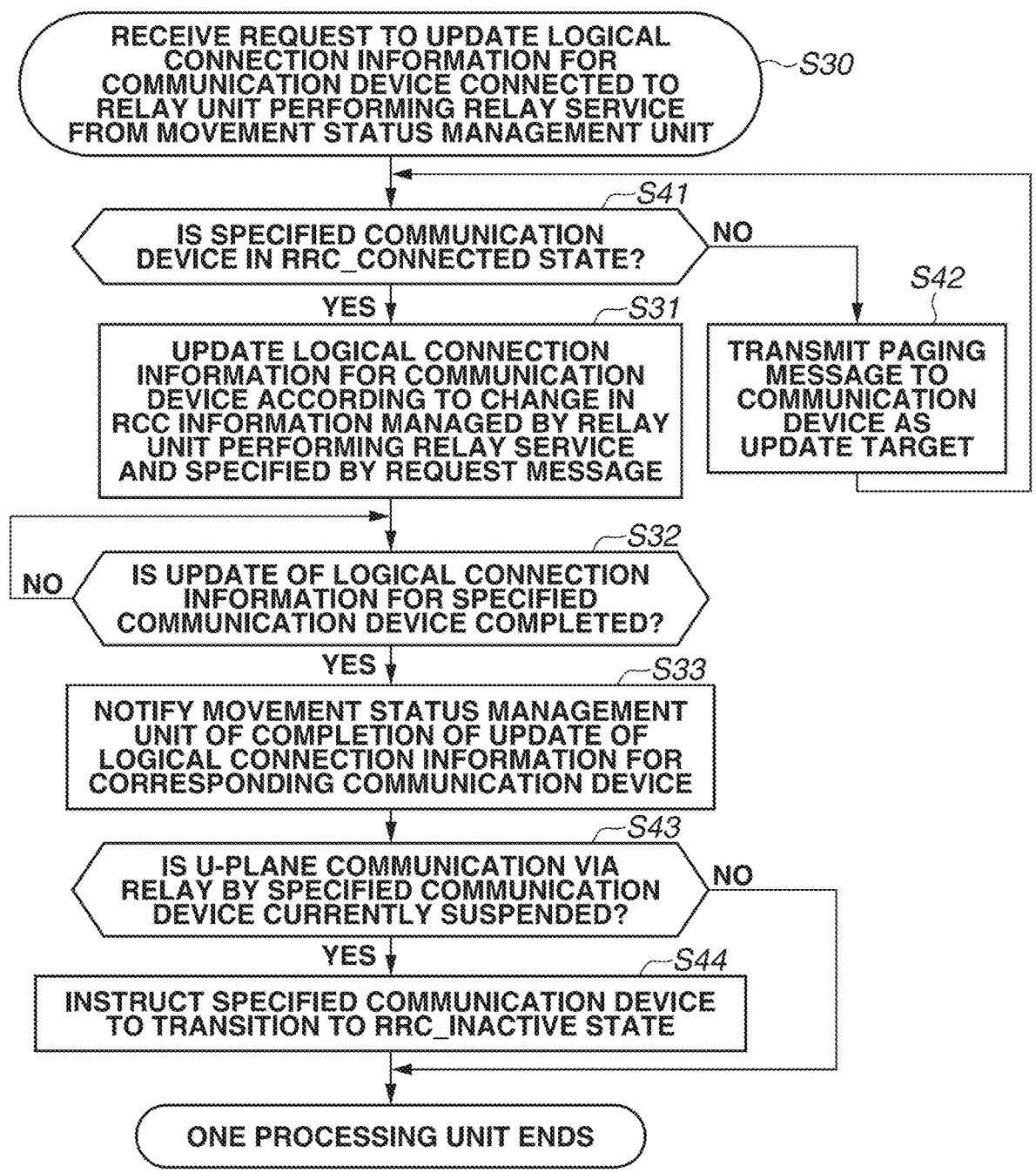
FIG. 18 is a flowchart illustrating a logical connection information update process performed by an access control unit according to the second exemplary embodiment.

FIG. 18 is a flowchart illustrating a logical connection information update process performed by the access control unit according to the second exemplary embodiment.

In the flowchart in FIG. 18, the processes of steps S41 to S44 are added to the flowchart in FIG. 14.

After the process of step S30, in step S41, the network-side management apparatus 5B determines whether the specified communication device 1 is in the RRC_CONNECTED state. If the specified communication device 1 is in the RRC_CONNECTED state (YES in step S41), the processing proceeds to step S31. On the other hand, if the specified communication device 1 is not in the RRC_CONNECTED state (NO in step S41), the processing proceeds to step S42. In step S42, the network-side management apparatus 5B transmits a paging message to the communication device 1 as the update target, and the processing returns to step S41.

After the process of step S33, in step S43, the network-side management apparatus 5B determines whether U-plane communication via the relay unit 3 by the specified communication device 1 is currently suspended. If U-plane communication via the relay unit 3 by the specified communication device 1 is not currently suspended (NO in step S43), the network-side management apparatus 5B ends the logical connection information update process. On the other hand, if U-plane communication via the relay unit 3 of the specified communication device 1 is currently suspended (YES in step S43), the processing proceeds to step S44. In step S44, the network-side management apparatus 5B instructs the specified communication device 1 to transition to the RRC_INACTIVE state, and ends the logical connection information update process.

As described above, according to the second exemplary embodiment, in a case where a communication device for which logical connection information is updated while the communication device is connected to a relay unit is in a power saving communication state, a network-side management apparatus causes the communication device to transition to a normal communication state. In this way, even in a case where the communication device connected to the relay unit moves between cells, the network-side management apparatus can shorten the time required until the resumption of network wireless communication, while enabling the communication device to perform power saving control.

In the first and second exemplary embodiments, a description has been given of a method of, when the communication device 1 connected to the relay unit 3 moves in the same direction and at the same speed as the relay unit 3, updating the logical connection information for the communication device 1 connected to the relay unit 3 together with the update of logical connection information for the relay unit 3.

In a third exemplary embodiment, in a case where the communication device 1 connected to the relay unit 3 remains in a residence cell, and the relay unit 3 moves from the residence cell of the communication device 1, the communication device 1 switches the connection destination from the relay unit 3 to the base station 4A using logical connection information for the residence cell held in the communication device 1.

FIG. 19 is a diagram illustrating a communication method using logical connection information according to the third exemplary embodiment.

In FIG. 19, this communication system includes a communication device 8 instead of the communication device 1 in FIG. 6. The communication device 8 includes a logical information storage unit 801 and a connection destination switching unit 802. The communication device 8 has a hardware configuration similar to that of the communication device 1 or 2 in FIG. 2.

The logical information storage unit 801 stores logical connection information IA updated via the relay unit 3 and used for a connection with the base station 4A. If the connection destination switching unit 802 recognizes the disconnection of communication with the relay unit 3 using the wireless communication medium WA, based on the logical connection information IA stored in the logical information storage unit 801, the connection destination switching unit 802 switches to communication with the base station 4A using the wireless communication medium WB.

Suppose that when the bus 7 is present inside the cell NWA, a person who carries the communication device 8 gets off the bus 7. Then, the bus 7 moves from inside the cell NWA to inside the cell NWB. At this time, a channel that uses the wireless communication medium WA cannot be maintained between the communication device 8 and the relay unit 3.

The communication device 8 causes the inter-device communication unit 20 to monitor the wireless communication medium WA, thereby recognizing that the relay unit 3 moves out of the area of the cell NWA.

If the communication device 8 recognizes that the relay unit 3 moves out of the area of the cell NWA, the communication device 8 starts the base station communication unit 19 and secures a direct communication path with the base station 4A using the wireless communication medium WB. Then, the communication device 8 performs network communication with the base station 4A not via the relay unit 3.

FIG. 20 is a sequence diagram illustrating a communication resumption sequence of the communication device in the communication system using the communication method illustrated in FIG. 19.

In FIG. 20, in step K81, the network-side management apparatus 5A performs an authentication/permission process on the communication device 8. If the authentication/permission process is successful, then in step K82, the communication device 8 resumes a connection between the communication device 8 and the network-side management apparatus 5A using the wireless communication medium WB. At this time, the communication device 8 holds logical connection information for the cell NWA that can be used in the cell NWA, and thus, in step K83, the network-side management apparatus 5A succeeds in resuming network communication. Then, in step K84, the network-side management apparatus 5A notifies the communication device 8 of the success of the resumption. Then, in step K85, the network-side management apparatus 5A opens a port for network communication, thereby resuming network communication with the communication device 8.

As described above, according to the third exemplary embodiment, if a communication device recognizes the disconnection of communication with a relay unit, the communication device switches to direct communication with a base station based on logical connection information held in the communication device. In this way, even in a case where the relay unit moves out of the area of a residence cell of the communication device, the communication device can resume network communication without updating the logical connection information held in the communication device. Thus, it is possible to reduce the time required until the resumption of network communication.

<Other Exemplary Embodiments>

In the above exemplary embodiments, a case has been described as an example where a change in cell information is caused by a change of the base station involved in the movement of a relay unit. The change in the cell information may be caused by an increase or decrease in communication devices included within the same cell, or may be caused by an operation for updating unique information regarding a communication device included within the same cell. The unique information regarding the communication device is, for example, an ID unique to the communication device.

Other Embodiments

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-156392, filed Sep. 17, 2020, which is hereby incorporated by reference herein in its entirety.

What is claimed is:

1. A network management system for managing communication between a base station and a User Equipment; (UE); the network management system comprising:
   one or more processors; and
   one or more memories storing instructions that when executed by the one or more processors causes the functions of the following units to be performed:
   a management unit configured to manage communication between a UE and a first base station relayed via a relay communication apparatus; and
   an update unit configured to, based on receiving information updating first logical connection information used by the relay communication apparatus for accessing communication between the relay communication apparatus and the first base station;
   (i) update second logical connection information stored at the network management system, the second logical connection information used for accessing the communication between the UE and the first base station, and
   (ii) initiate a process for updating third logical connection information stored at the UE, the third logical connection information corresponding to the second logical connection information and used, by the UE, for accessing the communication between the UE and the first base station relayed via the relay communication apparatus.

2. The network management system according to claim 1, wherein the UE connects to the relay communication apparatus using a first wireless communication medium, and the relay communication apparatus connects to the base station using a second wireless communication medium.

3. The network management system according to claim 2, further comprising a recognition unit configured to recognize a change in cell information relating to the residence cell of the relay communication apparatus,
   wherein the update unit updates, based on the recognition of the change in the cell information by the recognition unit, the second logical connection information stored at the network management system together with an update of the first logical connection information stored at the network management system.

4. The network management system according to claim 3, wherein the change in the cell information is caused by a change of the base station of the residence cell of the relay communication apparatus resulting from a movement of the relay communication apparatus from a first residence cell associated with the first base station to a second residence cell associated with a second base station.

5. The network management system according to claim 3, wherein the change in the cell information is caused by an increase or decrease in a number of UEs included within a same cell.

6. The network management system according to claim 3, wherein the change in the cell information is caused by an operation for updating unique information regarding UEs included within a same cell.

7. The network management system according to claim 1, wherein the management unit includes:
   a first control unit configured to perform access control of each cell that is capable of communicating with the first base station;
   a first management unit configured to manage a movement status of the UE; and
   a second management unit configured to manage a communication session for the UE via the relay communication apparatus.

8. The network management system according to claim 1, further comprising a transition unit configured to, in a case where the third logical connection information is updated while the UE is in a power saving state, cause the UE to transition to a normal communication state.

9. The network management system according to claim 8, wherein the transition unit causes, based on transmission of an incoming call message to the UE, the UE to transition to the normal communication state.

10. The network management system according to claim 8, wherein the transition unit urges, in a case where the transition unit recognizes that communication using a wireless communication circuit by the UE, for which the third logical connection information is updated, is not performed for a predetermined period, the UE to transition to the power saving state.

11. The network management system according to claim 1, wherein the UE is a wireless online game apparatus.

12. The network management system according to claim 1, wherein the UE provides a service by combining content information stored in the UE itself and information acquired via a wireless communication circuit.

13. An User Equipment (UE) comprising:
   a control unit configured to control communication with a base station via a relay device using a first wireless communication medium;
   a storage unit configured to store logical information used for a connection with the base station, the information updated via the relay device in a case where the base station that is connected to the relay device changes from a first base station to a second base station due to a movement of the relay communication apparatus; and
   a switching unit configured to, in a case where the switching unit recognizes disconnection of communication with the relay device using the first wireless communication medium, switch to communication with the base station using a second wireless communication medium based on the logical information stored in the storage unit.

14. A communication method at a communication apparatus that relays communication between a base station and a User Equipment, UE, the communication method comprising:
   controlling communication between a UE and a first base station relayed via a relay communication apparatus; and
   based on receiving information updating first logical connection information used by the relay communication apparatus for accessing communication between the relay communication apparatus and the first base station;
   (i) updating second logical connection information stored at the network management system, the second logical connection information used for accessing the communication between the UE and the first base station, and
   (ii) initiating a process for updating third logical connection information stored at the UE, the third logical connection information corresponding to the second logical connection information and used, by the UE, for accessing the communication between the UE and the first base station relayed via the relay communication apparatus.

15. A relay communication apparatus capable of relaying communication between a base station and a User Equipment (UE), comprising:
a control unit configured to control (i) communication with first base station using a first wireless communication medium and (ii) communication with the UE via a second wireless communication medium;
a storage unit configured to store first logical connection information used for a connection with a base station, the first logical connection information updated in a case where the base station connected to the relay device changes from the first base station to a second base station due to a movement of the relay communication apparatus,
wherein the relay communication apparatus sends the first logical connection information relating to the second base station to a network management system in connection with such updating of the first logical connection information; and
a transmission unit configured to forward information received from the network management system to the UE, in order to update second logical connection information stored at the UE, the second logical information corresponding to the first logical information.

16. The relay communication apparatus according to claim 15, wherein the UE connects to the relay communication apparatus using a first wireless communication medium, and the relay communication apparatus connects to the base station using a second wireless communication medium.

17. The relay communication apparatus according to claim 16, further comprising a monitoring unit configured to recognize a change in cell information relating to the residence cell of the relay communication apparatus, wherein the update unit updates, based on the recognition of the change in the cell information by the recognition unit, the first logical connection information stored at the relay communication apparatus.

18. The relay communication apparatus according to claim 17, wherein the change in the cell information is caused by a change of the base station of the residence cell of the relay communication apparatus resulting from a movement of the relay communication apparatus from a first residence cell associated with the first base station to a second residence cell associated with a second base station.

19. The relay communication apparatus according to claim 17, wherein the change in the cell information is caused by an increase or decrease in a number of UEs included within a same cell.

20. The relay communication apparatus according to claim 17, wherein the change in the cell information is caused by an operation for updating unique information regarding UEs included within a same cell.

21. The relay communication apparatus according to claim 15, wherein the UE is a wireless online game apparatus.

22. The relay communication apparatus according to claim 15, wherein the UE provides a service by combining content information stored in the UE itself and information acquired via a wireless communication circuit.

* * * * *